July 2, 1935.  W. W. SLOANE  2,006,607
POWER SHOVEL
Filed Aug. 8, 1931   15 Sheets-Sheet 1
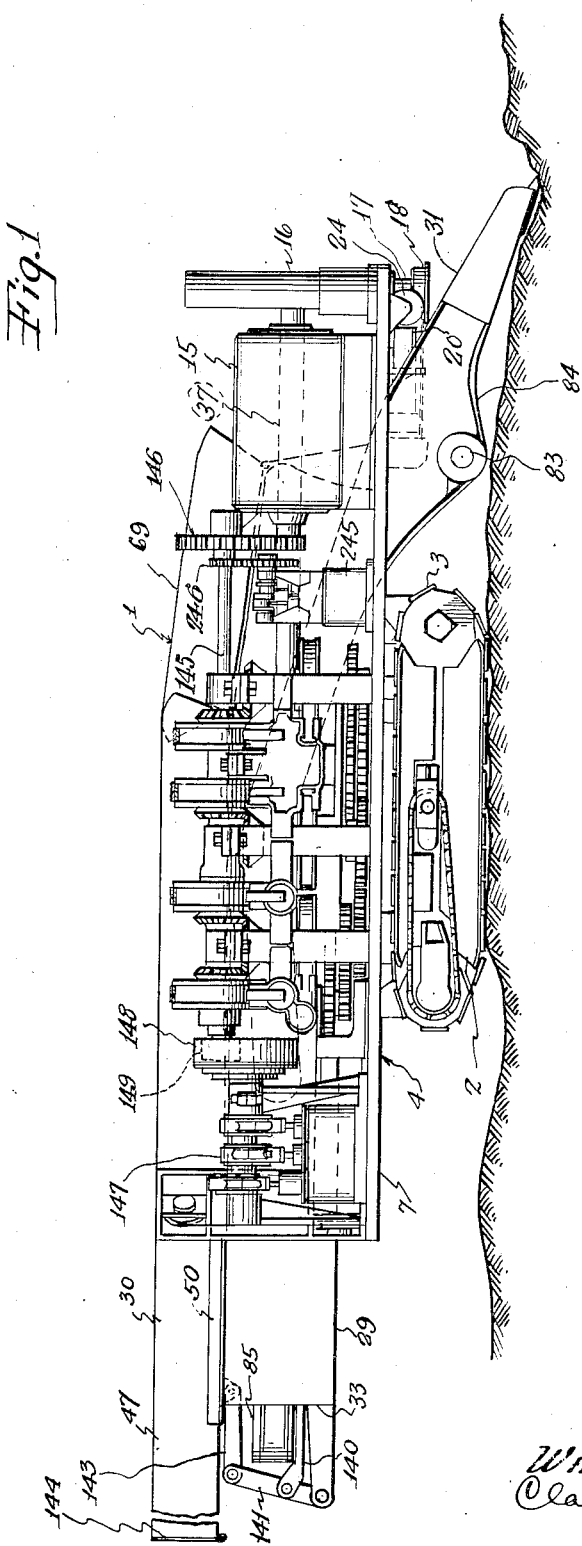

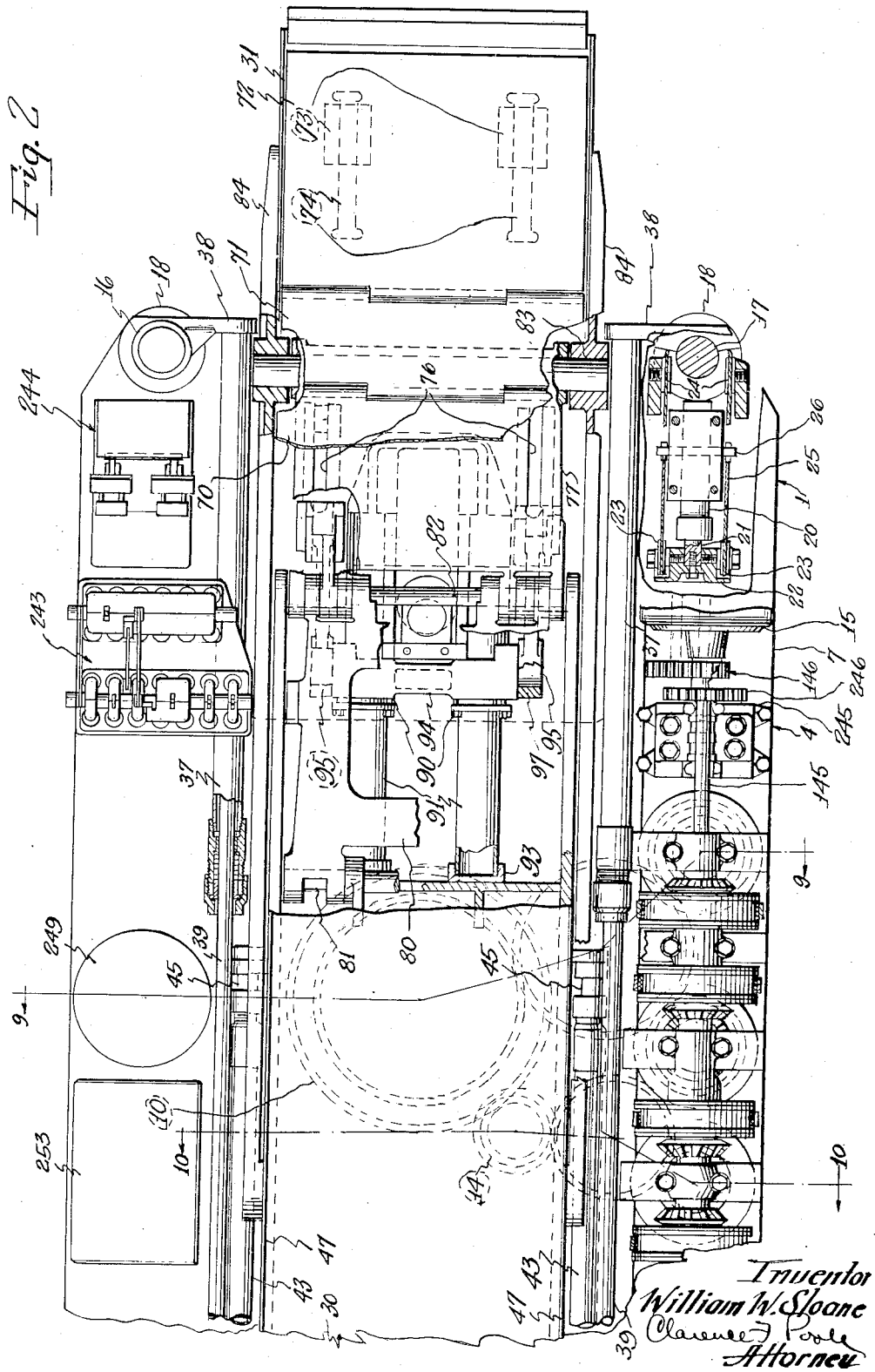

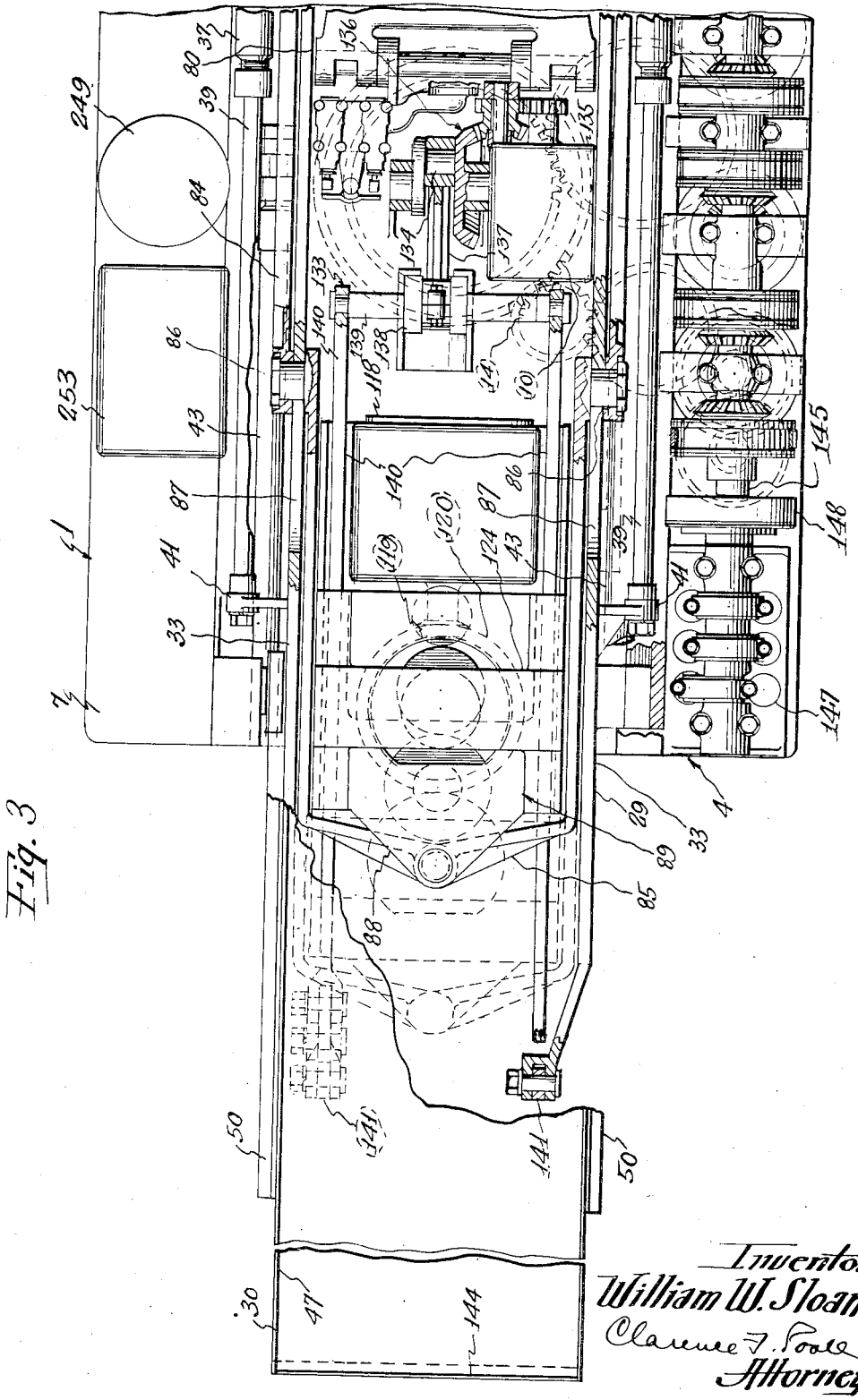

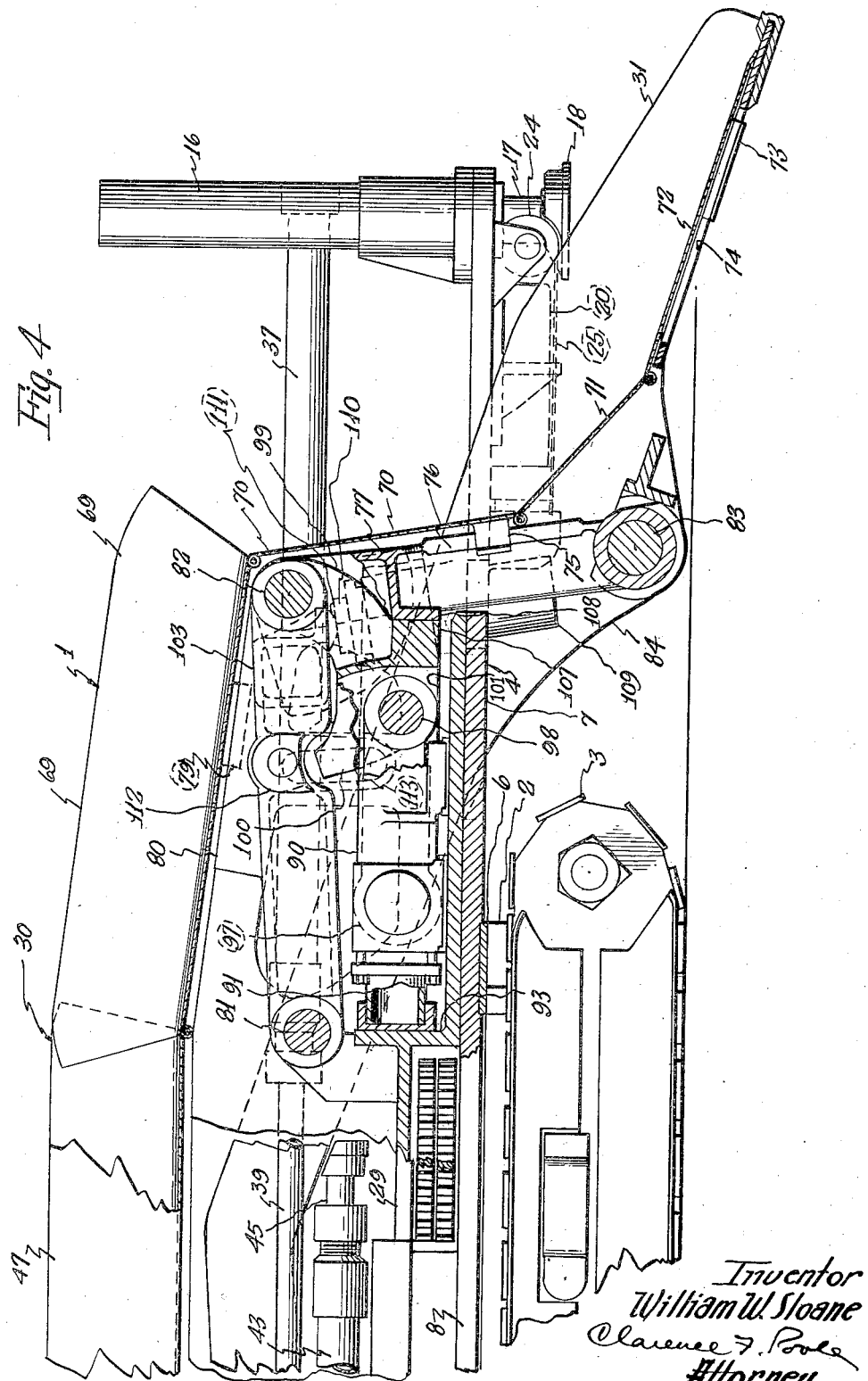

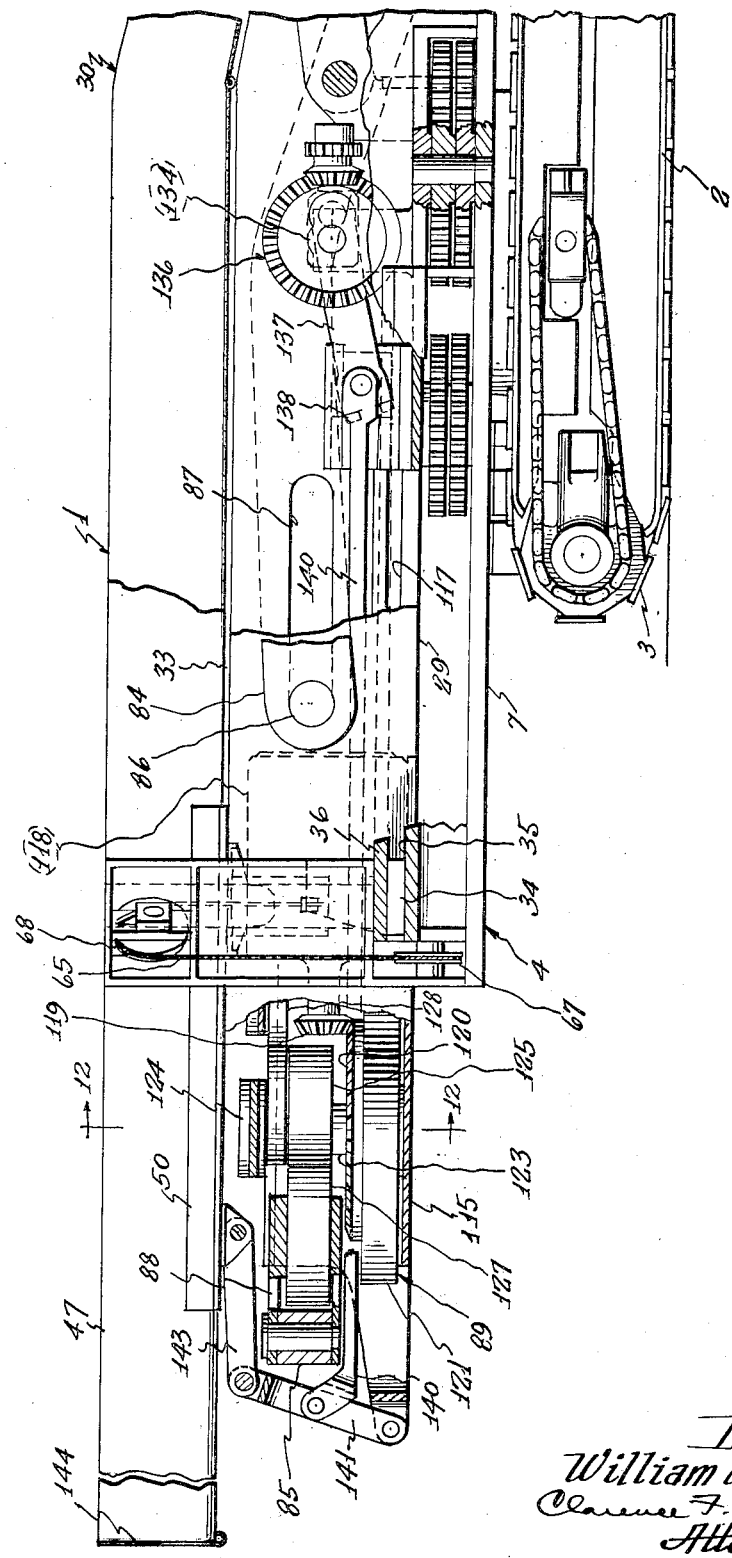

July 2, 1935.  W. W. SLOANE  2,006,607
POWER SHOVEL
Filed Aug. 8, 1931    15 Sheets-Sheet 6
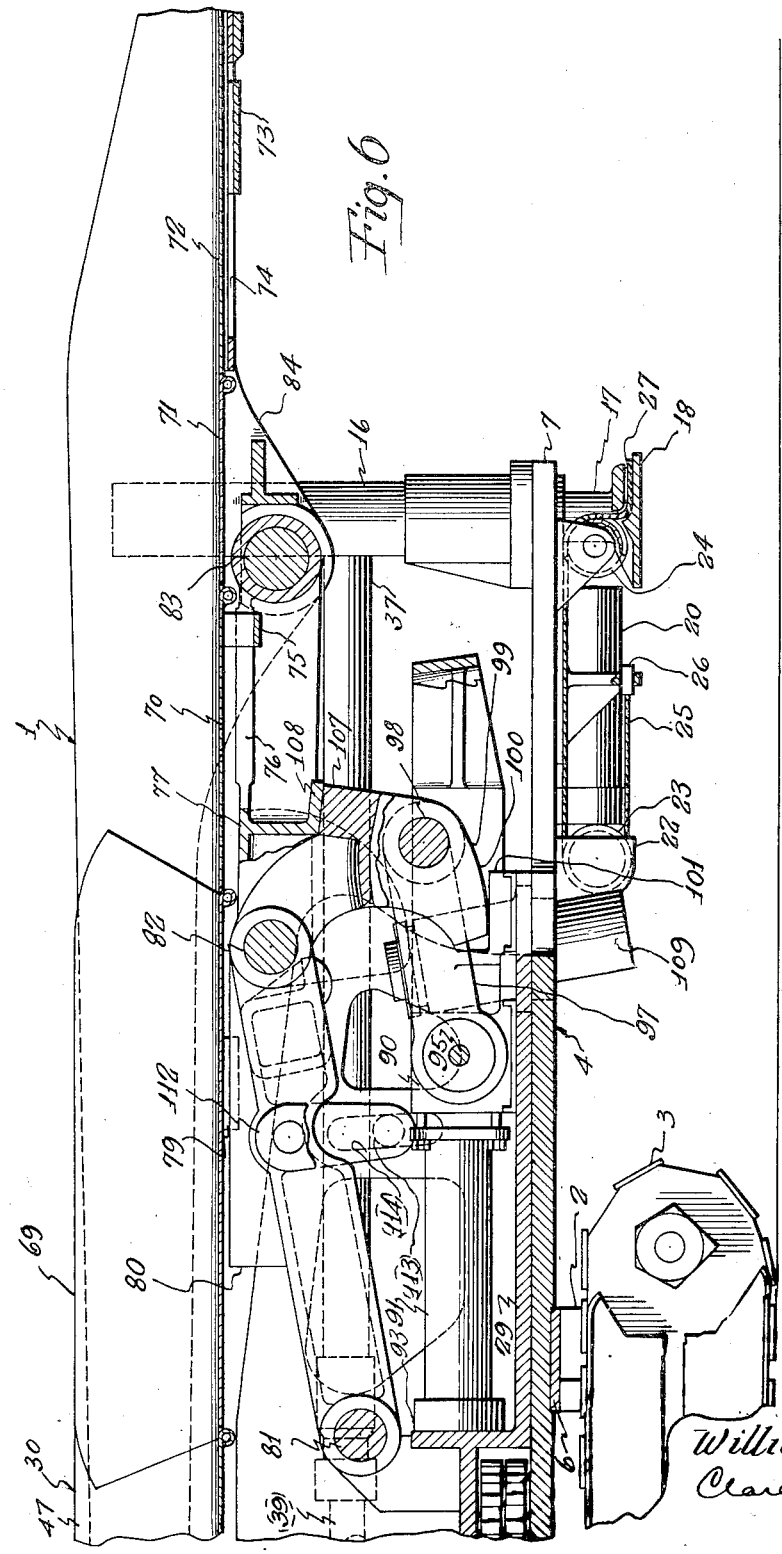

July 2, 1935.  W. W. SLOANE  2,006,607
POWER SHOVEL
Filed Aug. 8, 1931    15 Sheets-Sheet 7
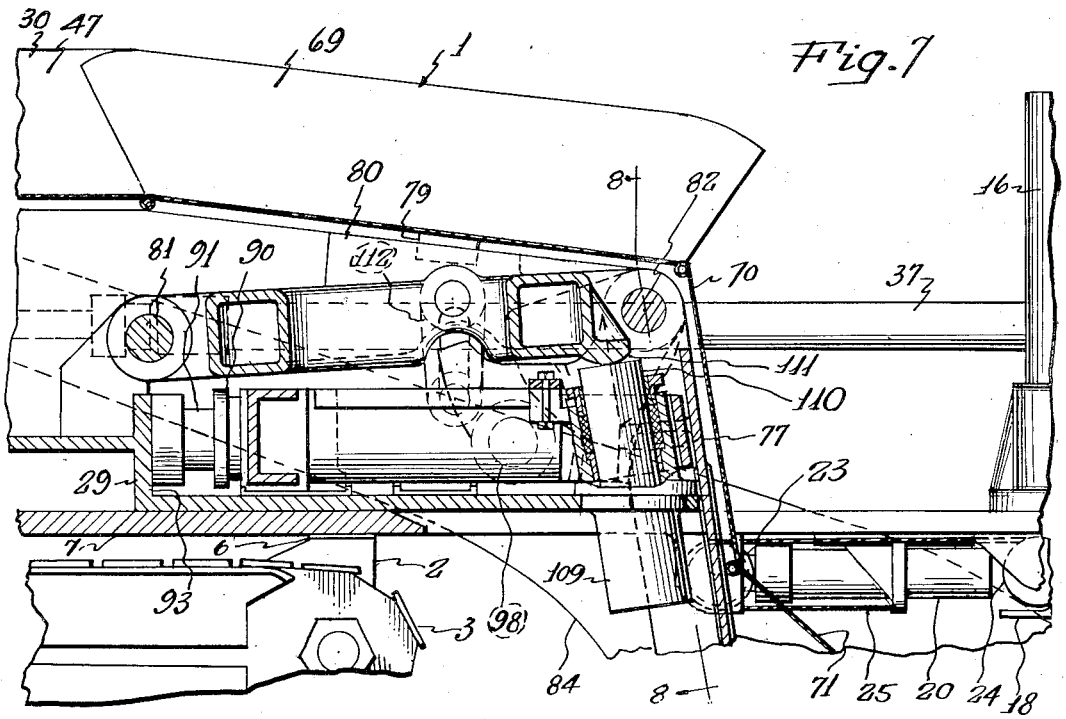
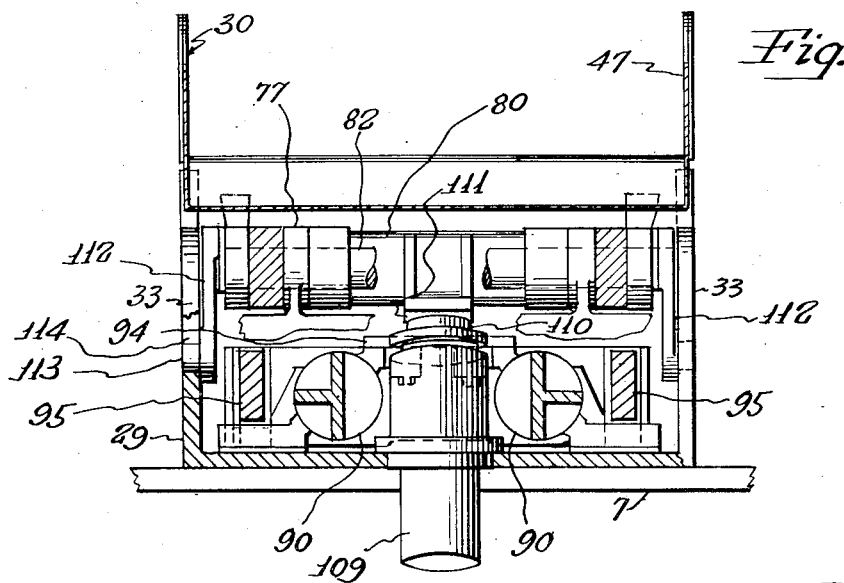
Inventor
William W. Sloane
Clarence F. Poole
Attorney

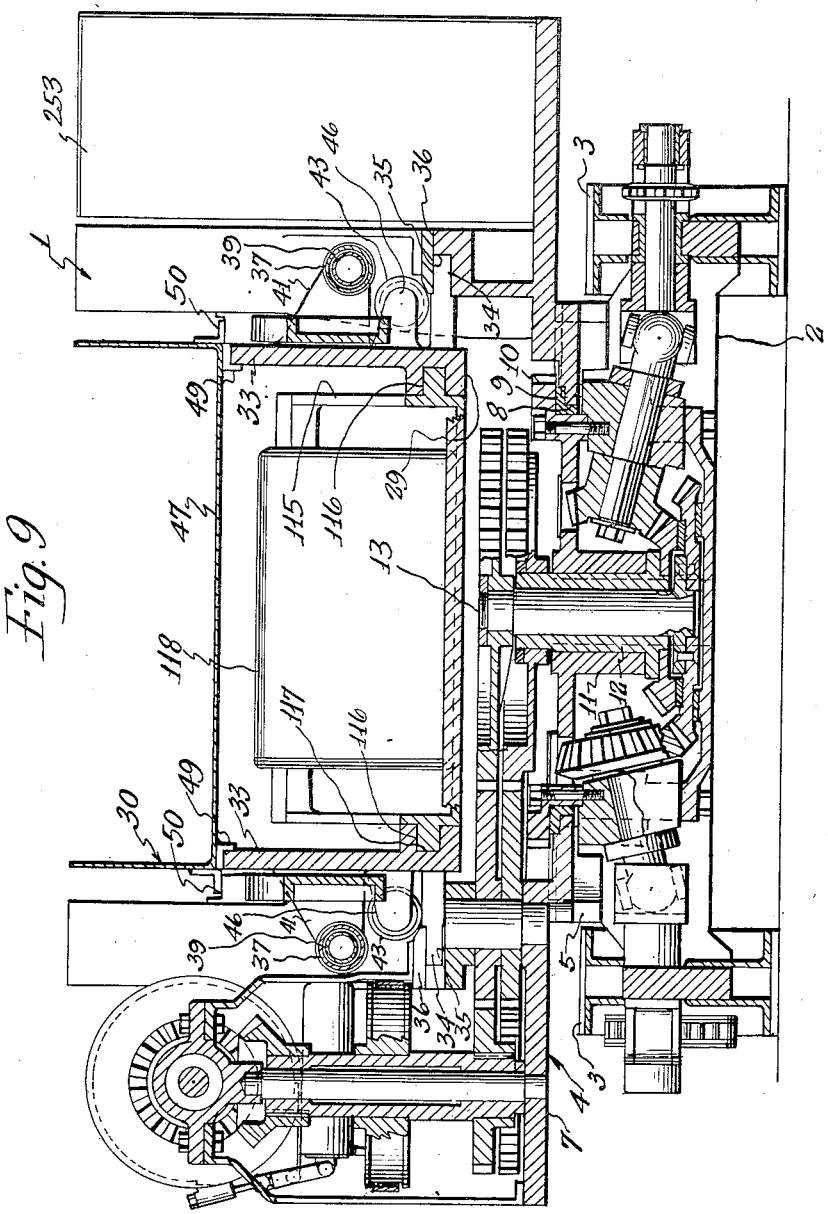

July 2, 1935. W. W. SLOANE 2,006,607
POWER SHOVEL
Filed Aug. 8, 1931 15 Sheets-Sheet 9

Inventor
William W. Sloane
Clarence F. Poole
Attorney

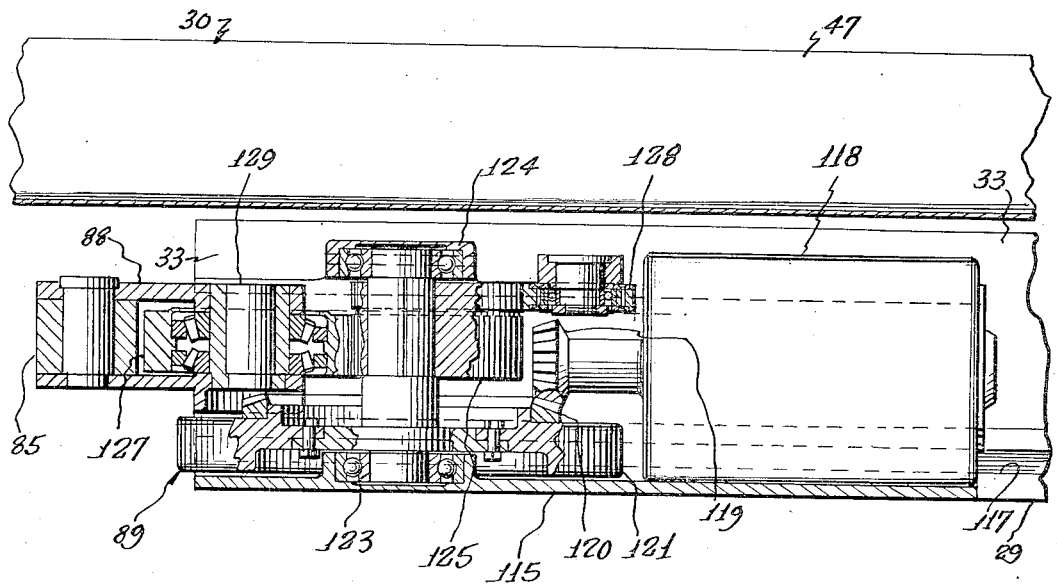
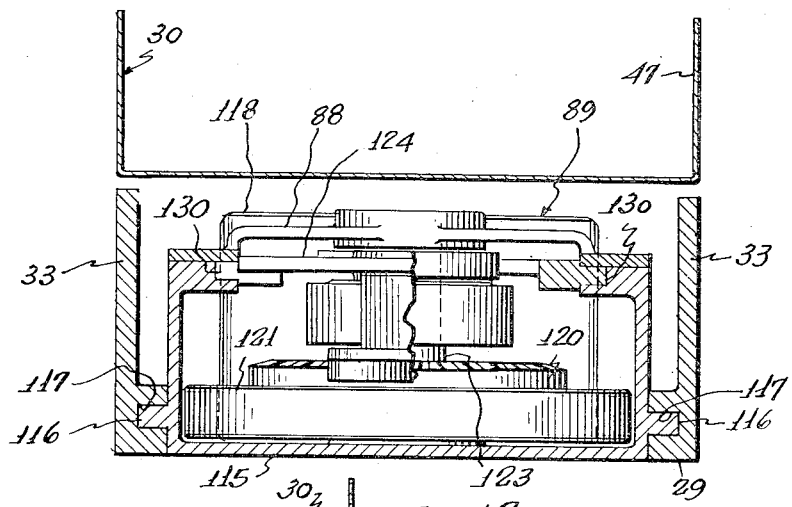
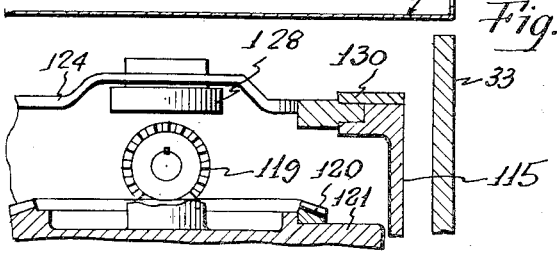

Inventor
William W. Sloane
Clarence F. Poole
Attorney

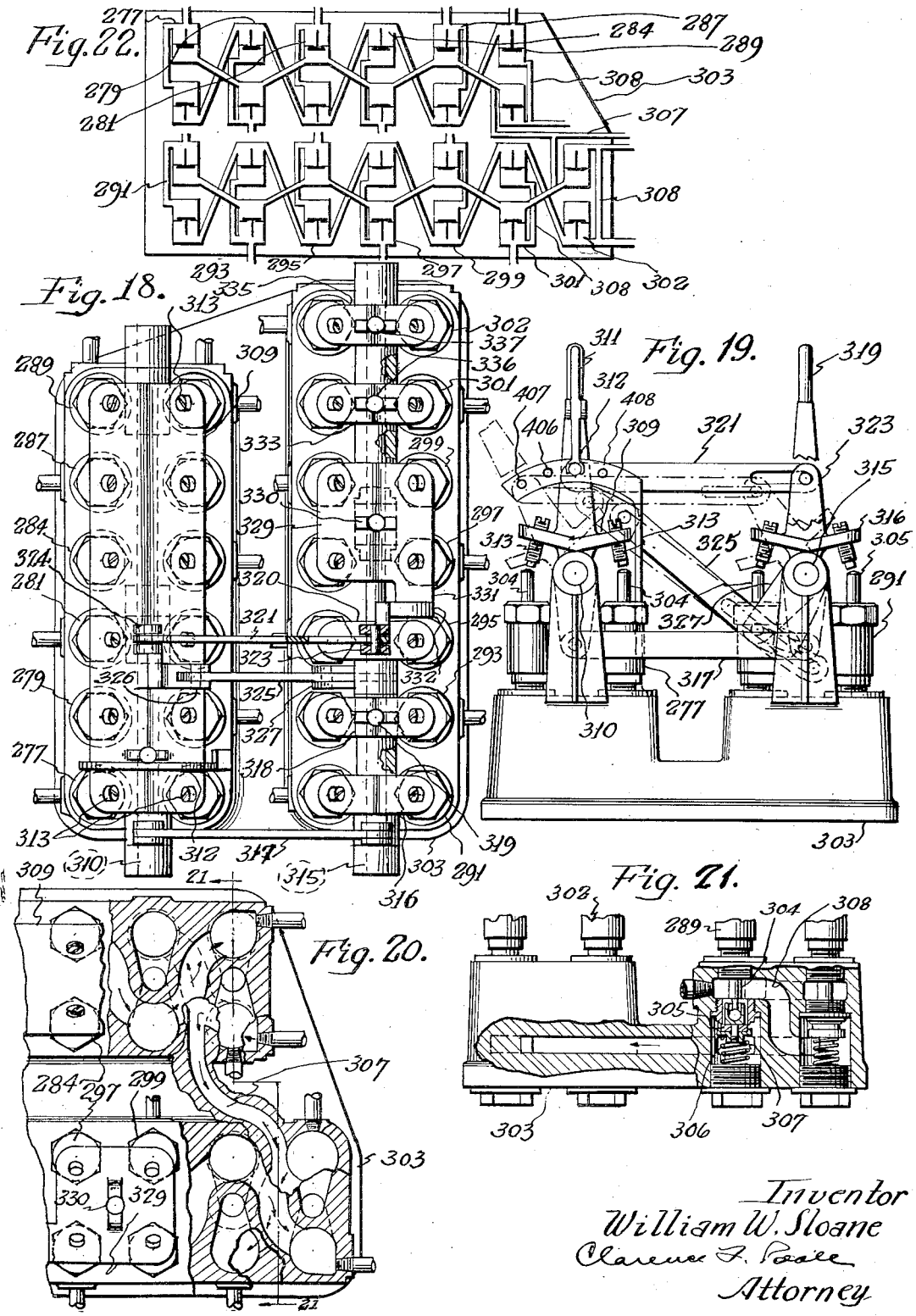

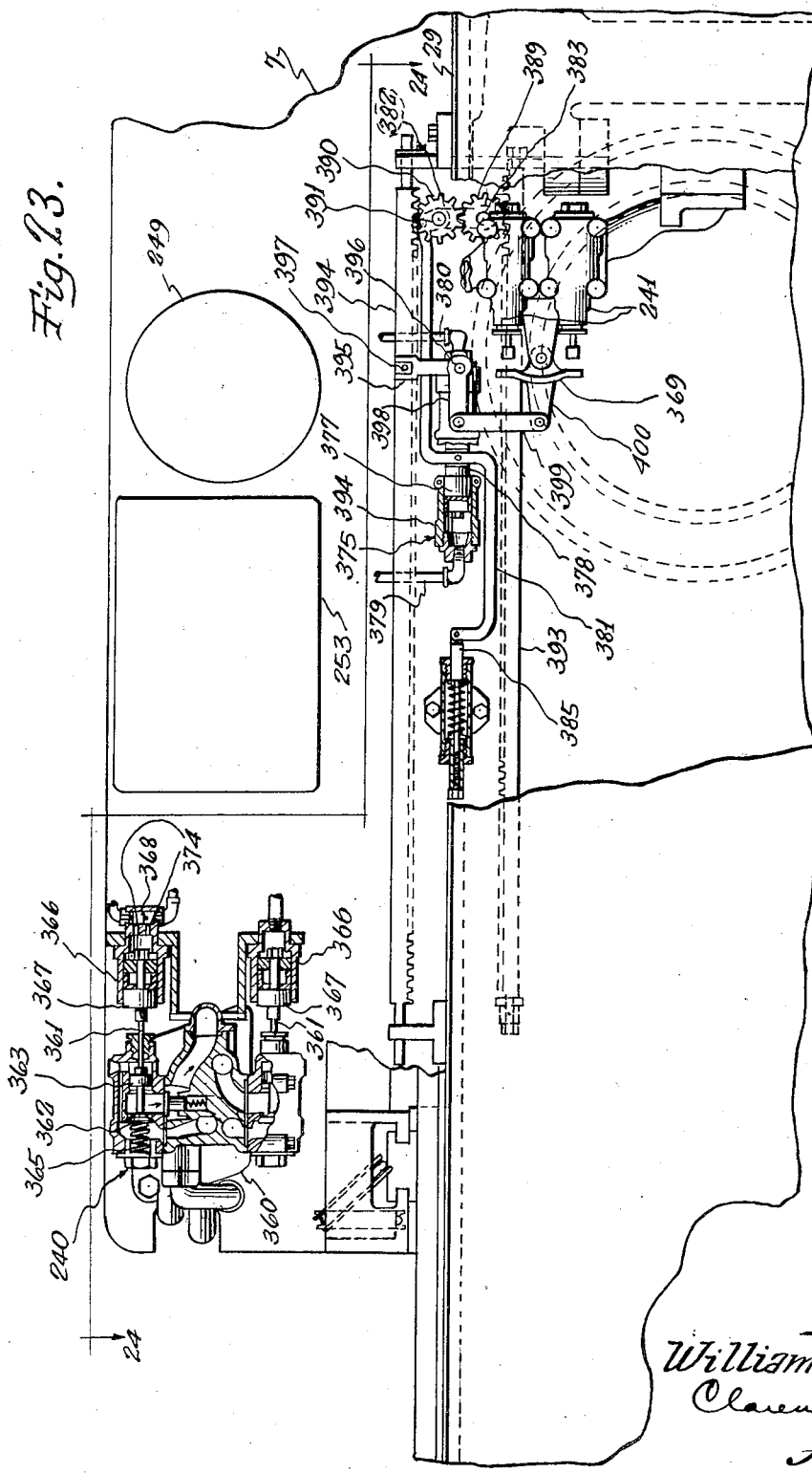

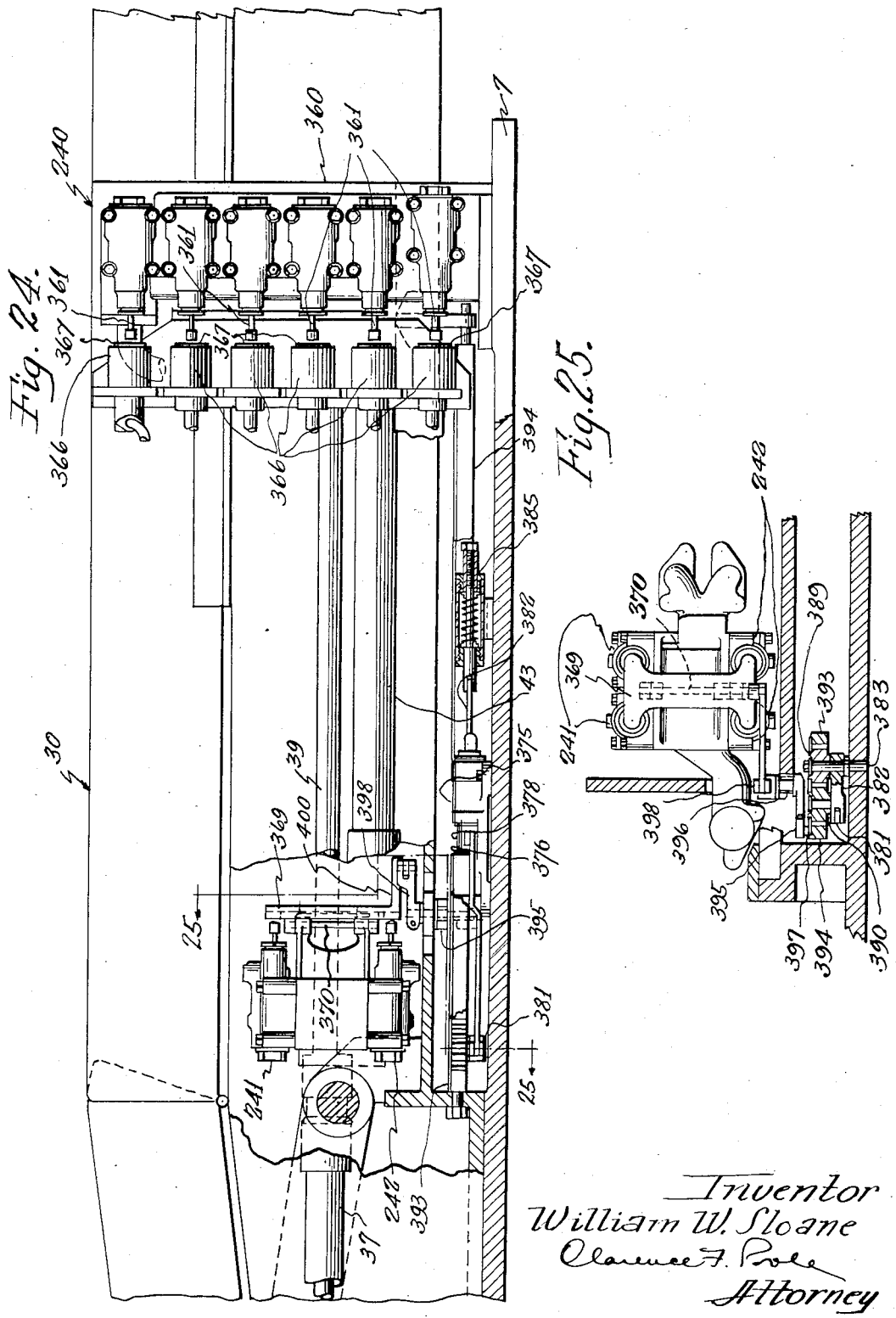

July 2, 1935.  W. W. SLOANE  2,006,607
POWER SHOVEL
Filed Aug. 8, 1931   15 Sheets-Sheet 15

Fig. 76.

Inventor
William W. Sloane
Clarence F. Poole
Attorney

Patented July 2, 1935

2,006,607

UNITED STATES PATENT OFFICE 2,006,607

POWER SHOVEL

William W. Sloane, Chicago, Ill., assignor to Goodman Manufacturing Company, Chicago, Ill., a corporation of Illinois Application August 8, 1931, Serial No. 555,943

20 Claims. (Cl. 214—90)

My invention relates to improvements in power shovels particularly adapted to operate in confined spaces, such as are encountered in mines, although not limited to this use alone.

The general objects of the invention reside in the provision of a power shovel which is adapted to efficiently scoop and discharge material in confined spaces, such as are encountered in mines, all with a view towards ease and simplicity in operation, compactness, convenience, adaptability, high production and general all around efficiency.

Other objects of my invention will appear from time to time as this specification proceeds.

My invention may be more clearly understood with reference to the accompanying drawings herein:

Figure 1 is a side elevation of the device of my invention;

Figure 2 is an enlarged plan view of the forward portion of the device embodying my invention with parts broken away and in section;

Figure 3 is an enlarged plan view of the rearward portion of the device embodying my invention with parts broken away and in section;

Figure 4 is an enlarged side elevation of the forward portion of the device embodying my invention with parts broken away and in section;

Figure 5 is an enlarged side elevation of the rearward portion of the device embodying my invention with parts broken away and in section;

Figure 6 is an enlarged side elevation of the forward portion of the device embodying my invention with parts broken away and in section and showing the device in a different position than in Figure 4;

Figure 7 is an enlarged fragmentary side elevation of the forward portion of the device embodying my invention with parts broken away and in section to more clearly show the details of my invention;

Figure 8 is a partial fragmentary sectional view taken substantially on line 8—8 of Figure 7;

Figure 9 is an enlarged sectional view taken on line 9—9 of Figure 2;

Figure 11 is an enlarged fragmentary view of the rearward portion of the device embodying my invention showing certain details of my invention;

Figure 12 is an enlarged partial transverse sectional view taken on line 12—12 of Figure 5;

Figure 13 is an enlarged partial fragmentary sectional view showing certain details of my invention;

Figure 18 is a plan view of a gang of valves used in the device of my invention with parts broken away and in section to show the details thereof;

Figure 19 is a side elevation of the gang of valves shown in Figure 18;

Figure 20 is a fragmentary plan view of the gang of valves shown in Figure 18 with parts broken away and in section to show the fluid pressure circuit through the valve manifold;

Figure 21 is a sectional view taken on line 21—21 of Figure 20;

Figure 22 is a diagrammatic view showing the fluid pressure circuit through the gang of valves shown in Figure 18;

Figure 23 is a partial fragmentary top plan view of a portion of the device of my invention with parts broken away and in section showing the details of certain other of the valves used in the hydraulic system;

Figure 24 is a sectional view taken on line 24—24 of Figure 23;

Figure 25 is a sectional view taken on line 25—25 of Figure 24; and

Figure 26 is a diagrammatic view of the entire fluid pressure circuit of the device of my invention.

Like numerals refer to like parts throughout the various figures.

Figure 10:
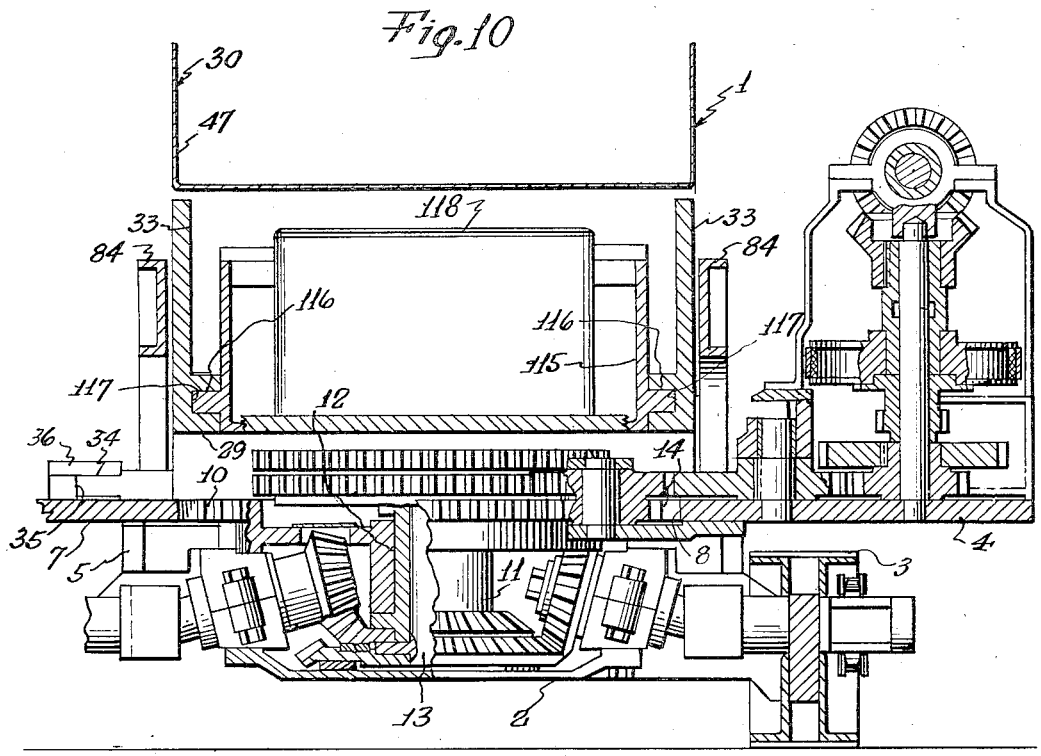
Figure 10 is an enlarged partial sectional view taken substantially on line 10—10 of Figure 2.

Referring now in particular to the drawings, I designates a power shovel of the type embodying my invention which is supported on a base frame 2. The base frame 2 in turn is mounted for propulsion on suitable laterally spaced continuous tread devices 3. A turntable 4 supports the major part of the shovel operating mechanism and is rotatably supported on the base frame 2 on an upright ring 5 and bearing pads 6 disposed forwardly and rearwardly of said turntable.

The turntable 4 comprises a platform 7 having a large central bore 8 therein. A flanged bushing 9 is freely mounted within the bore 8 of the platform 7. This bushing is so disposed that the flange of said bushing abuts a recess on the top side of said platform. A gear 10, having its bottom face abutting the flange of said bushing, is provided with a shoulder journaled within said bushing and a hub 11 journaled on a sleeve 12 freely mounted on a vertical shaft 13 disposed centrally of the base frame 2. The gear 10 is fixed to the base frame 2 by means of suitable cap screws in an ordinary manner (see Fig. 9). Thus the lower face and shoulder of the gear 10 prevent tipping of the platform 7 and turntable 4 and said turntable is journaled within the bushing 9 for rotation about the axis of the vertical shaft 13. A pinion 14 driven from a suitable motor 15, herein shown as an electric motor, in a manner which will hereinafter be fully described, meshes with the gear 10 for driving the platform 7 around said gear.

Mounted on opposite sides of the platform 7 on the extreme forward end thereof is a pair of downwardly facing vertically disposed fluid pressure cylinders 16 containing pistons 17 having feet 18 on their lower end so arranged that the pistons may be lowered by fluid pressure in the cylinders to engage the feet 18 with a fixed part such as a mine floor, thus forming a means for leveling the power shovel and holding the base frame 2 and power shovel 1 in a steady position during the loading operation. Said cylinders will hereinafter be called leveling cylinders.

The feet 18 are disengaged from the ground by means of fluid pressure cylinders 20 mounted on opposite sides of the underside of the platform 7 and extending rearwardly from the cylinders 16. Each fluid pressure cylinder 20 is provided with a piston 21 having a bracket 22 fixed to its outer end. The bracket 22 is provided with a plurality of sheaves 23. Another pair of sheaves 24 are provided adjacent each cylinder 16 on opposite sides thereof. A flexible cable 25 has one end fixed on a member 26 adjacent one side of the cylinder 20. This cable extends rearwardly from the member 26 around one sheave 23 and forwardly around one sheave 24 and downwardly around a groove 27 in the foot 18 of the piston 17. This cable extends from said groove on the opposite side of the foot 18 upwardly around the other sheave 24 and rearwardly and around the sheave 23, from whence it extends forwardly to the member 26.

The cable 25 has its end fixed to the member 26 on the opposite side of the cylinder 20 from said first mentioned end of said cable so when pressure is applied to the piston 21 the foot 18 will be raised in an obvious manner. These cylinders 20 will hereinafter be termed foot lifting cylinders. The cylinders 16 and 20 are operated by fluid pressure in a manner which will hereinafter be more fully described and the valves for operating said cylinders are interconnected with the turntable operating levers so the feet 18 may be disengaged from the ground as the turntable 4 is turned about its axis. This means of inerconnecting the valves for operating the cylinders 16 and 20 with the turntable 4 will hereinafter be more fully described.

The platform 7 is provided with a sliding frame 29 which supports a conveyor generally indicated at 30. The conveyor 30 may be of any type well known to the art but is herein preferably shown as being a reciprocating or jigging conveyor of a type well known to those familiar with the art. The conveyor 30 is provided with a scoop 31 and has its forward portion hinged so said scoop may be lowered to engage the ground and move along the ground to gather material, and elevated to discharge said material into said conveyor.

Referring now in particular to the sliding frame 29, this frame and the platform 7 are provided with a cut-away portion at their forward end to accommodate operating means for the scoop 31 and conveyor 30 so said scoop may be engaged with or disengaged from the ground. The sliding frame 29 bears on and has sliding engagement with the platform 7 adjacent the forward end thereof and extends the entire length of the platform 7 and is provided with a pair of upstanding side walls 33 on opposite sides thereof rearwardly of said aforementioned cut-away portion, which side walls form a slidable support for the conveyor 30.

Support members 34 extend horizontally outward from opposite sides of the side walls 33 adjacent the lower portion thereof for substantially the entire length of said side walls and have slidable engagement with shoulders 35 on the platform 7. A retaining strip 36 is attached to the platform 7 and abuts the top portion of each support member 34 and forms a sliding guide for said support members so the sliding frame 29 may be slidably moved longitudinally of said platform.

Means are provided for moving the sliding frame 29 on the platform 7, which means are herein preferably shown as being hydraulically operated. Said means include cylinders 37 mounted on opposite sides of the platform 7 adjacent the inner sides of the cylinders 16. The forward end of each cylinder 37 is fixed in a bracket 38 fixed to each cylinder 16. A piston 39 is provided for each cylinder 37 and extends rearwardly therefrom. The rearward end of each piston 39 is fixed to the upstanding side walls 33 of the sliding frame 29 by means of brackets 41. These last mentioned cylinders will hereinafter be referred to as in-cylinders.

A pair of cylinders 43 are fixed to upstanding support members 44, which support members are fixed to the platform 7 adjacent the rearward end thereof. These cylinders extend forwardly from the upstanding support members 44 and are provided with pistons 45 therein. The pistons 45 have their forward ends fixed in members 46 extending outwardly from opposite sides of the upstanding side walls 33. These last mentioned cylinders will hereinafter be referred to as the out-cylinders.

As fluid pressure is applied to the cylinders 43 the sliding frame 29 is moved forwardly along the platform 7 to move the scoop 31 into the material to be loaded. As pressure is applied to the cylinders 37 the sliding frame 29 may be moved rearwardly along the platform 7 and returned to its initial position on said platform.

Referring now in particular to the conveyor 30 and means for supporting said conveyor for reciprocable movement longitudinally of the power shovel and for supporting its rearward end for vertical adjustment with respect to the ground, said conveyor comprises a chute 47 extending longitudinally of the power shovel beyond the forward and rearward ends of the platform 7. The chute 47 is supported on the upstanding side walls 33 of the sliding frame 29, for slidable movement with respect thereto, by angles 49 fixed to opposite sides of the underside thereof having their legs extending downwardly from the inner side thereof. These angles engage the top portion of the upstanding side walls 33 for guiding the conveyor chute 47 for reciprocable movement along said side walls.

Figure 14:
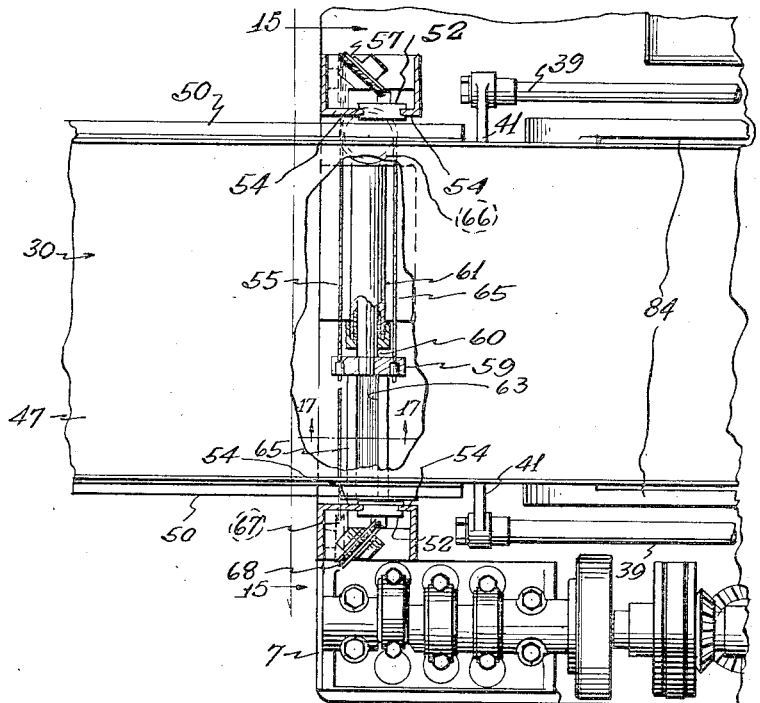
Figure 14 is a partial enlarged plan view of the rearward portion of the device embodying my invention with parts broken away and in section to more clearly show the details of my invention.
Figure 15:
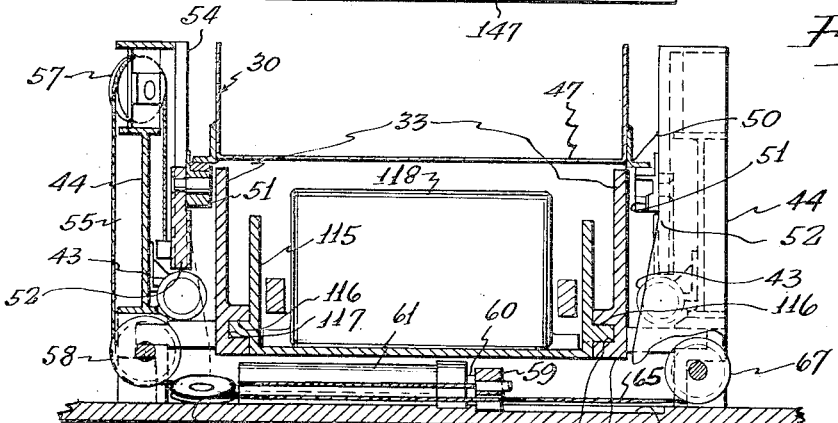
Figure 15 is a sectional view taken on line 15—15 of Figure 14.
Figures 16, 17:
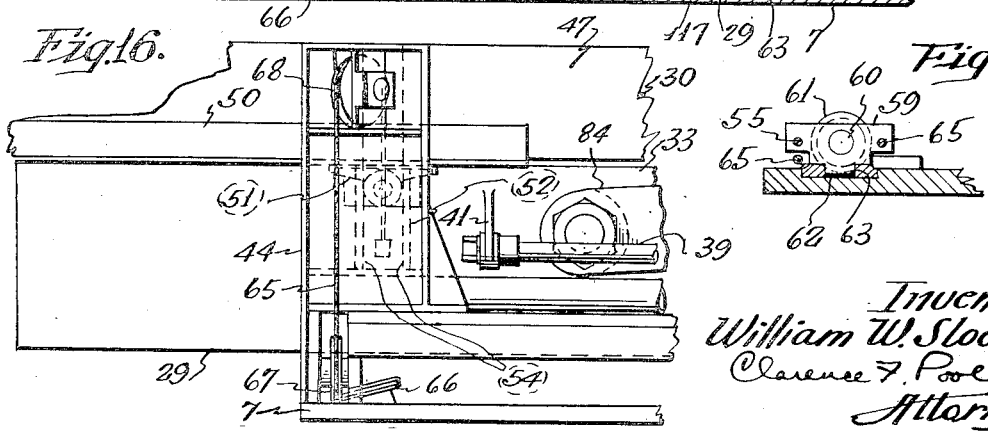
Figure 16 is an enlarged fragmentary side elevation of the rearward portion of the device embodying my invention showing certain details thereof.
Figure 17 is an enlarged sectional view taken on line 17—17 of Figure 14.

Angles 50 are fixed to opposite sides of the conveyor chute 47 adjacent the lower end thereof. These angles have their legs extending outwardly and are engageable with a vertically movable member 51 supported for vertical movement in the upstanding support members 44 (see Figs. 14, 15 and 16).

The vertically movable member 51 is pivotally supported on a block 52 having guide grooves on each side thereof, which guide grooves are engaged by vertically extending guides 54 in the upstanding support members 44. A flexible cable 55 is fixed to the outer side of the left hand block 52 and extends upwardly therefrom around a sheave 57 supported in the upstanding support member 44 adjacent the upper end thereof. The cable 55 extends downwardly from the sheave 57 around a sheave 58 adjacent the lower end of the upstanding support member 44 and transversely toward the opposite side of the machine where it has its end fixed to one side of a member 59. The member 59 is fixed on the outer end of a piston 60 mounted in a transversely extending fluid pressure cylinder 61 and has a tongue 62 extending downwardly therefrom movable in a transversely extending groove 63 formed in the platform 7.

A flexible cable 65 has one end fixed in the opposite side of the member 59. This cable extends along the cylinder 61 and around a sheave 66 and along said cylinder in an opposite direction to a sheave 67 supported for movement about a horizontal axis adjacent the lower end of the upstanding support member 44, from thence the cable 65 extends upwardly along said upstanding support member around a sheave 68 and downwardly where it has its end fixed in the outer side of the opposite block 52. Thus it may be seen that as fluid pressure is applied to the fluid pressure cylinder 61, the blocks 52 are moved vertically along the upstanding support members 44, which movement in turn causes vertical movement of the conveyor chute 47 and forms a means for adjusting the rearward end of said conveyor chute to the various desired car heights.

The forward portion of the conveyor chute 47 is provided with a hinged section 69. A plate 70 extends forwardly from and is hinged to the forward end of the hinged section 69. A plate 71 extends forwardly from and is hinged to the forward end of the plate 70, and another plate 72 extends forwardly from and is hinged to the forward end of the plate 71.

The plate 72 is supported on the scoop 31 for slidable movement with respect thereto by means of depending guide members 73 engaged by slots 74 in the scoop 31. Likewise, the plate 70 has depending guide members 75 engageable with slots 76 in a pivotally movable support frame 77. The hinged section 69 of the conveyor chute 47 is provided with depending guide members 79 engageable with longitudinal guides in a support frame 80 extending rearwardly of the pivotally movable support frame 77. The support frame 80 is pivotally supported at its rearward end on the sliding frame 29 by a transversely extending shaft 81, and the pivotally movable support frame 77 is pivotally supported on its forward end by means of a transverse shaft 82.

A shaft 83 is fixed in the forward portion of the pivotally movable support frame 77 and has its ends extending outwardly from each side thereof. A thrusting beam 84 is journaled on each of the outer ends of the shaft 83. These beams extend forwardly and rearwardly of the shaft 83 and have their forward ends fixed to the outside of the scoop 31. When the scoop 31 is in a downward position adjacent the mine bottom, or beneath the mine bottom as is illustrated in Figure 4, the thrusting beams 84 extend upwardly from the shaft 83 to the upstanding side walls 33 of the sliding frame 29 along said side walls on the outer sides thereof to a point rearwardly of the continuous tread devices 3.

A yoke 85 is mounted within the upstanding side walls 33 for movement longitudinally thereof. The yoke 85 is provided with outwardly extending bosses 86 adjacent the forward ends thereof, which bosses extend through longitudinally extending slots 87 in the upstanding side walls 33 of the sliding frame 29. The ends of these bosses extend outwardly beyond the upstanding side walls 33 and have the thrusting beams 84 pivotally mounted thereon in a suitable manner well known to those familiar with the art (see Fig. 3).

The rearward end of the yoke 85 has pivotal connection with a member 88 adjacent its central portion. The member 88 is connected with an intermittent thrust imparting mechanism 89 in a manner which will hereinafter be more fully described, so operation of said mechanism will transmit an intermittent thrusting action to the scoop 31 for forcing said scoop under large pieces of material when a predetermined pressure has been exerted on the forward edge of said scoop. When the scoop 31 is resting on the ground and it is desired to gather material, pressure is exerted on the pistons 45 in the out-cylinders 43. This moves the sliding frame 29 a distance equal to the length of the slot 87. When the sliding frame has moved this distance the rear end of the slot 87 engages the bosses 86 and exerts a pressure on the thrusting beams 84 which forces the scoop 31 into the material. When large pieces of material are encountered which cannot be gathered by the scoop 31 and a predetermined pressure has been exerted on said material by the out-cylinders 43 the intermittent thrusting mechanism 89 automatically comes into action and imparts a hammering movement on the scoop 31 to break up said material in a manner which will hereinafter be described.

Referring now in particular to the mechanism for raising the scoop 31 and elevating the conveyor 30 to a substantially horizontal position so material can be moved along said conveyor and discharged to a suitable receptacle such as a mine car, a plurality of longitudinally extending fluid pressure cylinders 90 are mounted on the sliding frame 29 for slidable movement with respect thereto. These cylinders will hereinafter be referred to as digging cylinders since they impart a digging as well as lifting action to the scoop 31 and are provided with rearwardly extending pistons 91, which pistons abut and are fixed to a shoulder 93 of the sliding frame 29 so the entrance of fluid pressure into the cylinders 90 will cause longitudinal movement of said cylinders along the sliding frame 29.

The fluid pressure digging cylinders 90 are connected together by means of a connecting member 94 provided with machined bosses 95 on the outer ends thereof. Each of these bosses has a connecting rod 97 pivotally mounted thereon. The opposite ends of the connecting rod 97 have pivotal connection with a shaft 98 adjacent the outer end thereof which is journaled in an elevating frame 99.

The elevating frame 99 extends transversely of the power shovel and has a portion 100 which extends downwardly and rearwardly from the shaft 98 when the conveyor 30 and scoop 31 are in an elevated position, as is shown in Figure 6. The lower portion of the portion 100 of the elevating frame 99 is of an arcuate shape and has bearing engagement with a bearing pad 101 on the sliding frame 29 as said elevating frame is operated by the digging cylinders 90 and connecting rods 97.

The upper or forward portion of the elevating frame 99 is pivotally connected to the transverse shaft 82 and thus has connection with the support frame 80 and the pivotally movable support frame 77, and has a shoulder 107 which is adapted to engage a support 108 depending from the pivotally movable support frame 77.

It may thus be seen that the application of fluid pressure to the digging cylinders 90, effects forward movement of said cylinders along the sliding frame 29 which moves the elevating frame 99 about the axis of the shaft 82 by means of the connecting rod 97. This pivotally moves the pivotally movable support frame 77 about the axis of the shaft 82 and raises said support frame and the thrusting beams 84 to raise the scoop 31 and move said scoop to a substantially horizontal position. When the pressure is released from the fluid pressure digging cylinders 90, the scoop 31 moves downwardly to engage the mine bottom by means of gravity.

Additional means are provided for elevating the scoop 31 when in a lowered position. Said means herein comprise an upwardly extending fluid pressure elevating cylinder 109 disposed adjacent the forward central portion of the sliding frame 29. The fluid pressure elevating cylinder 109 is provided with a piston 110 adapted to engage a bearing pad 111 depending from the support frame 80. Upward movement of the conveyor 30 and scoop 31 effected by the elevating cylinder 109 and piston 110 is limited by straps 112 pivotally connected to opposite sides of the support frame 80. These straps 112 have inwardly extending pins 113 adjacent their lower ends which engage slots 114 in the forward portion of the upstanding side walls 33 of the sliding frame 29 and thus limit upward movement of the support frame 80.

When the scoop 31 is in a lowered position and is wedged under a large piece of the material which cannot be lifted or dislodged by means of the fluid pressure digging cylinders 90 and elevating frame 99, the application of fluid pressure to the cylinder 109 will cause upward movement of the piston 110 which will in turn move a link 103 upwardly and elevate the entire scoop 31 to dislodge said material and release said scoop. Said cylinder may also be brought into operation when it is desired to lift the scoop for loading along an uneven bottom or from a bench on the bottom.

Referring now in particular to Figures 3, 5, 11, 12 and 13 and the details of the thrusting mechanism 89 which is arranged to impart an intermittent thrusting action on the forward edge of the scoop 31 when the pressure in the out-cylinders 43 reaches a certain predetermined value as has hereinbefore been mentioned, said thrusting mechanism includes a frame 115 having tongues 116 extending outwardly from each side thereof near the lower portion thereof. The tongues 116 are adapted to engage grooves 117 in the sliding frame 29 so the frame 115 may be reciprocably moved longitudinally of the sliding frame 29. A motor 118 is provided on the sliding frame 115. This motor may be of any type but is herein preferably shown as being an electric motor and has a bevel armature pinion 119 which meshes with and drives a bevel gear 120 fixed on the upper face of a flywheel 121. The flywheel 121 is fixed on a vertical shaft 123, which shaft is journaled in the frame 115 at its lower end and in a cross-member 124 extending across the frame 115 at its upper end. A cam 125 is keyed on the vertical shaft 123. This cam may be of any suitable form to impart the required intermittent thrusting action to the scoop 31 but is herein preferably shown as being circular in form mounted eccentrically of its center on the vertical shaft 123. The cam 125 is made of two parts which include an upper part and a lower part. The lower part of said cam is engaged by a roller 127 disposed rearwardly of the vertical shaft 123 while the upper portion of said cam is engaged by a roller 128 disposed forwardly of the vertical shaft 123. The rollers 127 and 128 are interconnected so as to impart reciprocatory movement to the yoke 85 or to cause the frame 115 to reciprocably move with respect to the frame 29 when said yoke is held from movement.

The roller 127 is mounted on a pin 129 by means of suitable ball bearings in a usual manner. The pin 129 is held in the member 88 at its top and bottom ends, which member has pivotal connection with the yoke 85 as has hereinbefore been mentioned. The top portion of the member 88 extends forwardly of the yoke 85 and around the shaft 123 and forms a bearing support for the roller 128 which is mounted on the forward portion of the member 88. The member 88 is provided with tongues 130 which ride in grooves formed by shoulders on the top portion of the frame 115 and the cross-member 124 which is fixed to the top portion of said frame (see Figs. 12 and 13). It may now be seen that rotation of the flywheel 121 tends to cause reciprocatory movement of the member 88 which tends to impart reciprocatory movement to the yoke 85. As the scoop 31 is moved into the loose material by the out-cylinders 43 and engages an obstruction which cannot safely be picked up by the action of said out-cylinders alone, when this certain predetermined limit of safe pressure has been reached the motor 118 is automatically started in a manner which will hereinafter be described. This will cause rotation of the flywheel 121 and cam 125. Since the sliding frame 29 is moved by means of the out-cylinders 43, the scoop 31 will remain stationary until the bosses 86 engage the rearward ends of the slots 87. When the bosses 86 engage the rearward end of the slots 87 movement of the sliding frame 29 will cause movement of the scoop 31. When the scoop 31 abuts an immovable piece of material and the motor 118 has been automatically started, the intermittent thrusting mechanism 89 moves reciprocably longitudinally of the sliding frame 29 in the grooves 117 due to the fact that the scoop 31 abuts the immovable piece of material. This causes an intermittent thrusting action to be transmitted to the scoop 31 through the yoke 85 and thrusting beams 84. This intermittent thrusting action advances the forward end of the scoop 31 into the material and either wedges said scoop under the material or breaks the material up so it may be picked up and loaded into the conveyor 30 by said scoop. The cam 125 is so arranged that the greatest force is exerted when the intermittent thrusting mechanism 89 is moving forwardly along the sliding frame 29. This imparts an intermittent thrusting action to the scoop 31 and counterbalances the reaction of the thrusting beams against the shovel frame and this additional force prevents said thrusting mechanism from moving the entire shovel rearwardly.

It should be understood that the intermittent thrusting mechanism 89 normally is inoperative and when loading loose material the cycle of loading is carried on without the use of said intermittent thrusting mechanism. This intermittent thrusting mechanism only comes into operation where the material to be loaded is of such size and texture that it cannot be loaded by means of the pressure exerted by the out-cylinders 43. It may thus be seen that during operation of said thrusting mechanism the out-cylinders 43 are continually exerting a pressure on the scoop 31 to force said scoop under the material, and that said thrusting mechanism is merely an auxiliary means to be used in conjunction with said out-cylinders to aid in breaking up and loading large pieces of material or material tightly wedged between the roof and bottom of the seam.

Referring now in particular to the conveyor 30 and means for reciprocably moving said conveyor to move material from the forward to the rearward end thereof, suitable reciprocatory drive mechanism generally indicated at 133 is provided for reciprocably moving the conveyor chute 47 (see Fig. 3). This reciprocatory drive mechanism includes a crank 134 driven by a motor 135 through a suitable gear train generally indicated at 136. A connecting rod 137 connects the crank 134 to a cross-head 138. A bar 139 is supported in the cross-head 138 and extends transversely of the sliding frame 29. A connecting arm 140 is connected to each of the ends of the bar 139 and extends rearwardly therefrom. The rearward ends of the connecting arms 140 are pivotally connected to a lever arm 141 adjacent the central portion thereof. The lever arm 141 is pivotally supported at its lower end on the sliding frame 29 while the upper end of said lever arm is connected to the conveyor chute 47 by means of a connecting link 143 in a usual manner. The crank 134 is so arranged that the conveyor chute 47 moves faster in a forward direction than in a rearward direction so as to move the material rearwardly along said conveyor chute in a usual manner and thus operation of the motor 135 reciprocably moves the conveyor chute 47 to transfer loose material rearwardly along said conveyor chute in a manner well known to those skilled in the art.

The conveyor chute 47 is provided with a gate 144 at its rearward end. The purpose of this gate is to provide means for loading the entire conveyor chute 47 before discharging the material into a receptacle. This forms a means for storing the material which is being loaded so the loading operation may be continued when the supply of cars has been exhausted.

The motor 15 forms an actuating medium for driving the continuous tread devices 3 and moving the power shovel 1 about the mine, for turning the turntable 4 about its axis, and for supplying fluid pressure to the fluid pressure system, the details of which will only be described insofar as is necessary to fully disclose my present invention. A longitudinally extending horizontal drive shaft 145 is provided on the right hand side of the machine and is driven from the motor 15 by means of a gear train indicated at 146. The rearward end of said shaft has driving connection with a suitable fluid pressure pump 147 through an internal gear 148 having operative connection with said pump and a pinion 149 keyed on the rearward end of said drive shaft. The fluid pressure pump 147 is of a usual three-cylinder construction of a type well known to those skilled in the art so will not herein be described in detail, and is used to provide a high pressure for the fluid pressure system.

The hydraulic system for controlling the various movements of the hydraulically operated parts will now be described.

In the device of my invention the main functions such as digging, crowding, etc., are operated at a relatively high pressure, while certain other functions; as, for instance, the operation of the high pressure valves, means for controlling the operation of the turntable 4 and continuous tread mechanisms 3 are operated at a lower pressure. In the high pressure system the pump 147, driven by the electric motor 15, serves to effect the pressure. The connection from this pump to the various actuating parts of the system are effected through valve means which, as shown, consist of platform valves generally indicated at 240 and digging and elevating valves generally indicated at 241 and 242. The platform valves 240 and digging and elevating valves 241 and 242 are in turn operated through suitable connections by means of a separate low pressure circuit including low pressure fluid pressure valve operating cylinders and low pressure valves. The low pressure valves consist of gang valves for operating the digging and elevating valves generally indicated at 243. Low pressure foot valves generally indicated at 244 are provided for controlling the operation of the turntable, and the connections therefrom will not herein be described in detail since they are no portion of my present invention.

A pump 245 driven by the electric motor 15 through the shaft 145 and gear train generally indicated at 246 serves to effect the pressure in the low pressure system. The connections from this pump to the various cylinders for actuating the high pressure valves and actuating parts of the low pressure system are effected through the gang valves 243 and foot valves 244.

Referring now in particular to the low pressure fluid pressure system, the fluid circulates from the pump 245 under pressure through a pressure pipe 247 which connects with a pressure equalizing tank 249 (see Fig. 26). From thence a pipe 250 connects with the pressure side of the manifolds for the gang valves 243 and foot valves 244. A return pipe 251 leads from the exhaust side of the manifolds for said gang and foot valves to a fluid pressure storage tank 253. The fluid pressure storage tank 253 serves as a reservoir for both the high and low pressure systems and has connection with the intake side of the pump 245 by means of a pipe 254.

The pressure equalizing tank 249 is provided with an inlet and outlet near the bottom end thereof and an air chamber above the fluid to equalize the fluid pressure in the pipe 250 and prevent surging in said pipe line upon operation of the pump 245. This provides an even pressure to the low pressure gang and foot valves 243 and 244 and enables the high pressure valves and low pressure mechanism to be positively operated through pistons actuated by fluid in the low pressure system at all times. A safety valve 255 is interposed between the pressure equalizing tank 249 and the fluid pressure storage tank 253 to operate when the pressures in said pressure equalizing tank exceed a maximum safe pressure.

A pressure responsive by-pass valve 256 of novel construction is connected in the low pressure system to permit unloading of said low pressure system when not in use in a manner which is not herein described in detail since it is no part of my present invention.

The gang valves 243 are arranged in two parallel banks and include the valves for operating the pistons to operate the high pressure valves for controlling the various operations of the shovel hereinbefore described and valves for allowing fluid under a lower pressure than used in the high pressure line to control the operation of the continuous tread devices 3. Part of these valves are connected so as to operate together so certain parts of the power shovel may be operated by the movement of one lever in a predetermined sequence.

The gang valves 243 include, in one bank, a pair of valves 277 for operating a valve 278 to allow fluid under a high pressure to enter the radial out-cylinders 43, a pair of valves 279 for operating a valve 280 for releasing fluid pressure from the radial out-cylinders 43, a pair of valves 281 for operating a valve 282 to allow fluid under a high pressure to enter the leveling cylinders 16 and engage the feet 18 with the ground and for operating a release valve 283 to release pressure from the lifting cylinders 20 which raise the feet 18 from the ground, a pair of valves 284 for operating a valve 285 to allow fluid under a high pressure to enter the lifting cylinders 20 to lift the feet 18 and for operating a release valve 286 to release pressure from the leveling cylinders 16 when fluid under pressure is entering the cylinders 20, a pair of valves 287 for operating the digging valves 241 to allow fluid under a high pressure to enter the digging cylinders 90 and elevate and force the scoop 31 into the loose material, and a pair of valves 289 for operating a pressure valve 290 to allow fluid under a high pressure to enter the radial in-cylinders 37 and move the sliding frame 29 inwardly along the platform 7.

The valves in the opposite bank include a pair of valves 291 for operating a valve 292 to release fluid pressure from the radial in-cylinders 37, a pair of valves 293 for operating the elevating valves 242 and allowing fluid under a high pressure to enter the cylinder 109 and lift the scoop 31, a pair of valves 295 for operating a throttle valve 296 to allow fluid to by-pass to the low pressure side of the high pressure system when said system is not in use, a pair of valves 297 for operating a valve 298 to allow fluid under a high pressure to enter a cylinder 61 and raise the rear end of the conveyor 30, a pair of valves 299 for operating a valve 300 to release fluid pressure from the cylinder 61, a pair of valves 301 for allowing fluid under a relatively low pressure for operating the mechanism for driving the left hand continuous tread devices 3 in a manner which is not herein described since it is no portion of my invention, and a pair of valves 302 for allowing fluid under a relatively low pressure to operate the mechanism for driving the right hand continuous tread device 3 in a manner which is not herein described since it is no portion of my invention.

The low pressure gang valves 243 are constructed as follows: (see Figs. 18, 19, 20, 21 and 22).

A horizontally disposed manifold 303 is secured on the turntable 4 as shown in Figure 2. This manifold is divided into two parallel banks. The six pairs of valves 277, 279, 281, 284, 287 and 289 are secured in one bank and the seven pairs of valves 291, 293, 295, 297, 299, 301 and 302 are secured in the opposite bank. Each pair of valves consists of an inlet valve and exhaust valve arranged so when the inlet valve is open the corresponding exhaust valve is closed and vice versa. This arrangement makes it possible to operate the valves together and use one line from the high pressure valve actuating cylinders for a pressure and exhaust line. These valves are similar in construction, each comprising a stem 304, a head 305 connected with the stem, and a spring 306 to move the valve head 305 into a closed position (see Fig. 21). In Figure 21 it may be seen that fluid under pressure enters the pressure valve of the pair of valves 289 through a passageway 307 on the lower side of the head of said valve, and that said fluid is communicated from the upper side of said valve to the lower side of the head of the exhaust valve by means of a passage 308.

Referring now in particular to the water circuit through the manifold 303 as diagrammatically shown in Figure 20, fluid under pressure enters said manifold through the passageway 307. This passageway 307 is divided into two branches so as to distribute said fluid to each bank of the manifold 303. Thus fluid pressure may be distributed to the pressure valve of the pair of valves 289 and the pressure valve of the pair of valves 287 and so on in one bank and to the pressure valve of the pair of valves 302, etc., in the opposite bank. The pressure valves as herein shown are preferably alternately arranged so one inner valve is a pressure valve and the next outer valve is a pressure valve. In other words, the exhaust and pressure lines cross each other. The purpose of so arranging these valves is to operate the greatest number of valves with the fewest possible number of levers so one lever will operate a pressure valve for one line and exhaust valve for another line.

The pairs of valves 277, 279, 281, 284, 287 and 289 are operated by a rocking member 309 mounted on a horizontal shaft 310 intermediate the pressure and exhaust valve of each pair of valves. Said rocking member is actuated by a hand lever 311 and held in its various operative positions by a pin and aperture lock generally indicated at 312 connected with said hand lever. Set screws 313 are threaded in opposite sides of the rocking member 309 and are adapted to engage each valve stem 304 for operating each respective valve upon movement of said rocking member. The set screws 313 are arranged so movement of the hand lever 311 a certain distance will operate certain valves and movement of said hand lever a greater distance will operate certain other valves.

Likewise, a horizontal shaft 315 is disposed intermediate the pressure and exhaust valves on the bank of valves 291, 293, 295, 297, 301 and 302. Said bank of valves is operated in a manner similar to the bank of valves 277, 279, 281, 284, 287 and 289 except that several of the valves 291, 293, 295, 297, 301 and 302 are independently operated and others are operated upon operation of the valves in the first bank. A rocking member 316 mounted on said shaft is adapted to operate the pair of valves 291. This rocking member is operated upon operation of the rocking member 309 through a link and crank connection indicated at 317 so when the pressure valve 277 opens the exhaust side of the pair of valves 291 will be closed and the pressure side of the pair of valves 291 will be open to relieve pressure in the radial in-cylinders 37 upon operation of the radial out-cylinders 43. When the hand lever 311 is moved in an opposite direction and fluid under pressure enters the radial in-cylinders 37 the link and crank connection 317 will open the exhaust side of the pair of valves 291 to allow the exhaust valve 291 to close so pressure may be built up in said cylinders to move the sliding frame 29 along the platform 7.

A rocking member 318 is mounted on the shaft 315 for operating the pair of valves 293 to cause fluid under pressure to enter the lifting cylinder 109 and lift the scoop 31. This rocking member is moved by a hand lever 319 and must be operated upon operation of the radial out-cylinders 43 since pressure to said cylinders is obtained by suitable piping connected to pistons for said radial out-cylinders.

The pair of valves 295 control the operation of the throttle valve 296. Said throttle valve serves to by-pass the fluid circulated by the pump 147 to the low pressure side of the fluid pressure system when said fluid pressure system is not in operation. Thus the throttle valve 296 must be closed when the various parts of the high pressure system are in operation. Said throttle valve is opened by means of a rocking member 320 on the horizontal shaft 315, which rocking member is moved upon movement of the rocking member 309 in either direction by means of a suitable system of cranks and links and is closed when said rocking member is in a neutral position. This system of cranks and links for actuating the rocking member 320 comprises a link 321 having pivotal connection with a crank 323 extending upwardly from the rocking member 309 at one end, and having slidable connection at its opposite end with a crank 324 extending upwardly from the rocking member 320 for opening the valve 295 upon movement of the rocking member 309 in one direction.

In order to open the valve 295 and close the valve 296 upon movement of the rocking member 309 in an opposite direction when operating the radial in-cylinders 37, another connection is provided between the rocking members 309 and 320 which comprises a link 325 having pivotal connection at one end with a crank 326 extending angularly inwardly from the rocking member 309 and integral with said rocking member and having slidable connection at its opposite end with a crank 327 integral with the rocking member 320 and extending downwardly and angularly inwardly therefrom. It may thus be seen that the valve 295 is opened upon movement of the rocking member 309 in either direction which will close the throttle valve 296 whenever the high pressure shovel operating mechanism is in operation.

The valves 297 and 299 for raising or lowering the rear conveyor 30 are operated by a rocking member 329 actuated by a handle 330. The rocking member 329 is connected with the valve 295 for opening said valve when the rear conveyor is raised independently of the other fluid pressure actuating parts of the power shovel by a lug 331 on the rocking member 329 which has engagement with a lug 332 on the rocking member 320.

The valves 301 and 302 for driving the continuous tread devices 3 are independently operated by rocking members 333 and 335, respectively, which rocking members are operated by hand levers 336 and 337 secured to said respective rocking members. Thus in order to drive the power shovel 1 in a straight forward direction the hand lever 336 is pulled toward the operator and the hand lever 337 is pushed away from the operator and in order to turn the power shovel in one direction or another one or the other of the hand levers 336 or 337 is moved in an opposite direction.

Referring now in particular to the platform valves 240 and the method of operating said valves from said aforementioned low pressure valves, said valves are mounted on opposite sides of a vertically disposed manifold 360 (see Figs. 23, 24 and 26). This manifold is secured on the turntable 4 adjacent the rearward left hand side thereof. The valves are similar in construction, each comprising a stem 361, a head 362 on the rearward end of said stem, a piston 363 spaced longitudinally from and forwardly of the head 362, a by-pass in the body of the valve connecting the rearward side of the head with the forward side of the piston and a spring 365 for moving the valve into closed position with a relatively light unvarying pressure.

As has hereinbefore been mentioned, each high pressure valve is operated by a low pressure valve operating mechanism actuated by pressure distributed from the respective low pressure valve. This valve actuating mechanism is mounted forwardly of the platform valves 240 and comprises a plurality of cylinders 366 having pistons 367 therein, each piston abutting the stem of a high pressure valve.

Fluid under pressure is admitted to each cylinder 366 upon operation of the associated low pressure valve through a suitable pipe, with the exception of the cylinder which operates the valve 285 for admitting fluid under pressure to the front lift cylinders 20. This cylinder has inlet pipes on opposite sides thereof, one leading from the gang valves 243 and the other leading from the foot valves 244 since the front lift pistons 21 are operated upon operation of either said gang valves or foot valves for disengaging the jack feet 18 from the ground upon operation of the turntable 4 or operation of the in-cylinders 37. Thus a means must be provided in the cylinder 366 for operating the valve 285 which will prevent fluid under pressure from entering said cylinder upon opening of the respective low pressure valves for admitting fluid under pressure to said cylinder upon operation of the gang valves 243 and foot valves 244 while one or the other of said valves is open. Said means herein comprises a piston 368 movable transversely of the cylinder 366 and adapted to be moved in one direction upon the admission of fluid under pressure through one of the aforementioned pipes to close the opening from the opposite pipe and vice versa. A port 374 communicates from each side of the cylinder in which the piston 368 moves with the cylinder 366. When fluid under pressure enters the cylinder 366 from one pipe the piston 368 is moved by fluid pressure so as to close the opposite pipe and associated port 374 and vice versa. It may thus be seen that fluid pressure through one inlet pipe closes the opposite inlet pipe and associated port 374 and prevents fluid from entering through said inlet pipe port and vice versa. It may thus be seen that the desired high pressure valve is opened upon admission of fluid under pressure to the respective cylinder 366 in an obvious manner, the spring 365 returning the piston to its initial position upon release of pressure in the cylinder 366.

The digging valves 241 and elevating valves 242, which control the admission of fluid under a relatively high pressure to the cylinders 90 and 109, respectively, are mounted on the sliding frame 29. These valves are arranged side by side one above the other and are operated by a rocking member 369 pivotally mounted on a vertical shaft 370 disposed between each set of valves so movement of said rocking member in one direction will open one set of valves and admit fluid under pressure to one set of cylinders while movement of said rocking member in an opposite direction will admit fluid under pressure to the other cylinder and release fluid from said first mentioned set of cylinders.

In looking at Figure 25 it may be seen that the valves 241 and 242 each comprise two valves, one of which valves, herein referred to by reference character 371, serves to admit fluid under pressure to the cylinder with which it is associated; the other of which valves, herein referred to by reference character 372, serves as a check valve to hold pressure in the respective cylinder. Fluid under pressure is carried to the valves 241 and 242 by means of a pipe 373 connected to the end of one out-cylinder 43 thus eliminating the use of a telescopic pipe between the platform 7 and said valves. Inasmuch as no exhaust valves are provided between the valves 241 and 242 and the respective cylinders 90 and 109, it is necessary that the check valves 372 be mechanically opened upon release of pressure in either the cylinders 90 or 109. The valves 241 and 242 are therefore so arranged that upon movement of the rocking member 369 in one direction the pressure valve in one set of valves will be opened and the check valve in the other set of valves will be closed. Furthermore, by providing mechanically operated check valves in the system pressure may be held in either the cylinders 90 or 109 upon release of pressure in the out-cylinders 43. The sets of valves 241 and 242 are thus mounted one beside the other so as to be operated together as may be clearly seen in Figures 23, 24, and 25.

The mechanism for moving the rocking member 369 and controlling the valves 241 and 242 will now be described. A pair of opposing aligned longitudinally extending cylinders 375 are secured on the platform 7. A piston 376 fits in the forward cylinder 375 and a piston 377 fits in the rearward cylinder 375. These pistons are connected together by a piston rod 378. Fluid under pressure is admitted to the forward cylinder 375 for moving the piston rod 378 in one direction upon opening of the pressure valve 293 through a pressure pipe 379 while fluid under pressure is admitted into the rearward cylinder 375 for moving the piston rod 378 in an opposite direction upon opening of the pressure valve 287 through a pressure pipe 380.

An actuating member 381 is secured to the piston rod 378 intermediate the pistons 376 and 377. This actuating member extends transversely of the piston rod 378 and thence forwardly and parallel with said piston rod along the outer side thereof and has its forward end pivotally connected to a lever 382 pivotally supported on the platform 7 by a vertical stud 383. The actuating member 381 also extends rearwardly along and parallel with the piston rod 378 beyond the cylinders 375 and has an outwardly curved rearward end connected to a spring operated plunger 385 (see Figs. 23 and 24). The spring operated plunger 385 is of an ordinary construction so will not be described in detail but is arranged so said plunger acts against its spring when moving in opposite directions. Since the pressure exerted on the plunger is equal in both directions of movement, said plunger tends to bring the piston rod 378 to a central position between the cylinders 375 when said cylinders are not in operation.

A spur pinion 389 is mounted on the stud 383 on the upper end thereof and bears on the upper side of the lever 382. Another spur pinion 390 meshes with the spur pinion 389 and is supported on the upper face of the lever 382 on a stud 391. The spur pinion 389 meshes with a longitudinally extending rack 393 secured to the sliding frame 29. Another longitudinally extending rack 394 is provided on the sliding frame 29. This rack is parallel with the longitudinally extending rack 393 and its teeth face the teeth of said first mentioned rack and is supported for reciprocable sliding movement with respect to said first mentioned rack. The spur pinion 390 meshes with the teeth of said second mentioned rack. Thus when the piston rod 378 is moved in one direction or another, the actuating member 381 moves the lever 382 about the axis of the stud 383. This moves the spur pinion with said lever which in turn moves the rack 394 in one direction or another. It may further be seen that upon movement of the sliding frame 29 with respect to the platform 7 that the spur pinions 389 and 390 will be moved along the racks 393 and 394 so the rack 394 and valves 241 and 242 may be operated in any position of the sliding frame 29 with respect to the platform 7. The rack 394 is connected to the rocking member 369 by means of a lever arm 395 pivotally supported on the underside of a portion of the sliding frame 29 on a pin 396 for pivotal movement with respect to said sliding frame about a vertical axis, which lever arm has a forked end adapted to be engaged by a pin 397 on the rack 394. A lever arm 398 is fixed on the upper end of the pin 396 adjacent the upper side of the portion of the sliding frame 29 which supports the lever arm 395 and extends at right angles to said lever arm. A link 399 connects the lever arm 398 with an arm 400 integral with the rocking member 369 so movement of the rack 394 in one direction or another actuated by the lever 382 and piston 376 or 377 will move the rocking member 369 and operate the valves 241 or 242 depending upon the direction of movement of said rocking member for allowing fluid under pressure to enter either the cylinders 90 or 109.

Referring now in particular to the high pressure fluid pressure system as diagrammatically shown in Figure 26, the pump 147 takes fluid from the tank 253 through a pipe 401, which pipe is a branch of the low pressure intake pipe 254 for the low pressure fluid pressure system. Fluid is discharged from the pump 147 under pressure through a high pressure line 402 to the high pressure side of the manifold 360 for the valves 240 for actuating the various parts of the shovel. Upon release of the exhaust valves of the manifold 360, fluid circulates back to the storage tank 253 through a return line 403. As has been before stated, the throttle valve 296 is provided in the high pressure system to by-pass the fluid from the pump 147 to the return line 403, storage tank 253, and intake pipe 401 back to said pump when the high pressure fluid pressure system is not in operation. As has been before stated, the throttle valve 296 is closed whenever it is desired to build up pressure in the high pressure fluid pressure system. The high pressure fluid pressure system is further provided with a safety by-pass valve 405 to relieve pressure from the high pressure line in case of emergency. This safety by-pass valve 405 is of an ordinary construction so will not be shown or described in detail.

As was stated with reference to the description of the low pressure fluid pressure gang valves 243, the pairs of valves 277, 279, 281, 284, 287, 289, 291 and 295 are connected together so these valves may operate together. The set screws 313 in the rocking member 309 are so arranged that when the hand lever 311 is in a position, indicated by reference character 406, the pressure valves 277, 281, 291 and 295 are open while the exhaust side of the valves 279, 284 and 289 are open. This opens the pressure valve 278 in the high pressure system which causes fluid under pressure to enter the radial out-cylinders 43 and simultaneously allows fluid under pressure to enter the cylinders 16 and releases fluid pressure from the lifting cylinders 20. At the same time fluid pressure is released from the radial in-cylinders 37 by means of the valve 291 which opens to open the return valve 292 in the high pressure fluid pressure system. This effects movement of the sliding frame 29 forwardly along the platform 7 and simultaneously lowers the jack feet 18 to engage the ground and hold the power shovel 1 in a relatively level position.

When the lever 311 is further moved in the same direction in a position indicated by reference character 407, one of the set screws 313 in the rocking member 309 engages the stem of the valve 287 to open said valve and allow fluid under pressure to enter the rearward cylinder 375 and exert pressure on the piston 377 to open the valves 241 to allow fluid under pressure to enter the digging cylinders 90 and raise the scoop 31 to a horizontal position.

When the hand lever 311 is moved in an opposite direction to a position indicated by reference character 408, the release valve of the set of valves 277 will be open, the pressure valve of the set of valves 279 will be open, the release valve of the set of valves 281 will be open, the pressure valve of the set of valves 284 will be open, the release valve of the set of valves 287 will be open, and the pressure valve of the set of valves 289 will be open, while the pressure valve of the set of valves 291 will be closed and the valve 295 will be open. This releases pressure from the radial out-cylinders 43, leveling cylinders 16 and digging cylinders 90 and allows fluid under pressure to enter the front lifting cylinders 20 to disengage the feet 18 from the ground. Simultaneously fluid under pressure enters the radial in-cylinders 37 through the pressure valve 290 to move the sliding frame 29 rearwardly along the platform 7.

It may thus be seen that the handle 311 serves to effect operation of the valves which actuate the mechanism for performing the major digging and loading operations of the shovel and that when said handle is moved in one direction a certain distance the scoop 31 is moved into the material to be loaded and when said handle is moved a further distance in the same direction the scoop 31 is elevated with its load to a horizontal position. It may further be seen that when said handle is moved in an opposite direction pressure is released from the cylinders 90 and the radial out-cylinders 43, which allows the scoop 31 to be lowered and the in-cylinders 37 return the scoop and sliding frame 29 to its initial position with respect to the platform 7, simultaneously disengaging the jack feet 18 from the ground.

When the handle 311 is in the position indicated by reference character 406, movement of the lever 319 which controls the operation of the valve 293 in a direction towards the bank of valves controlling the operation of the radial out-cylinders 43 will open the pressure valve 293 and allow fluid under pressure to enter the forward cylinder 375 and exert pressure on the piston 376 which will in turn open the elevating valves 242 to allow fluid under pressure to enter the elevating cylinder 109 and elevate the scoop 31 above the ground. Since fluid is piped to the valves 241 and 243 through the piston 45 for one radial out-cylinder 43 and pipe 373, the cylinders 90 and 109 may only be operated while the radial out-cylinders 43 are in operation.

Fluid under pressure is admitted to the cylinder 61 to elevate the rearward end of the conveyor 30 upon opening of the low pressure pressure valve 299 by operation of the handle 330. This causes fluid under a relatively low pressure to open the high pressure valve 300 and admit fluid under pressure to the cylinder 61 in an obvious manner. Movement of the handle 330 in an opposite direction opens the low pressure pressure valve 299 which opens the release valve 298 and releases fluid pressure from the cylinder 61.

Referring now in particular to the means for throwing the impact transmission mechanism 89 into operation when the pressure in the fluid pressure out-cylinders 43 reaches a certain predetermined value, a cylinder 409 is connected in a pressure line 410 which connects the pressure valve 278 with the radial out-cylinders 43. The cylinder 409 has a piston 411 therein, which piston is adapted to be moved in said cylinder by fluid pressure. A stem 412 extends outwardly through the cylinder 409 and a spring 413 surrounds said stem and abuts the piston 411 for returning said piston to its initial position in said cylinder and to prevent movement of said piston until pressure in the pressure line 410 has reached a certain predetermined value. The construction of this cylinder and piston is not herein shown in detail since it is of an ordinary construction well known to those familiar with the art but is diagrammatically shown in Figure 26. The stem 412 of the piston 411 has engagement with a push button switch 414 for closing said push button switch upon movement of said piston when actuated by fluid under pressure in the pressure line 410. This push button switch is of an ordinary type and closes the motor circuit when the button is held down by the stem 412 and opens the circuit when pressure against said button is relieved. Thus when the scoop 31 is performing the digging operation and is loading material and the pressure in the pressure line 410 and the out-cylinders 43 reaches a certain predetermined value due to the presence of obstructions or large lumps of material, said pressure will move the piston 411 in the cylinder 409 to close the push button switch 414 and close the circuit for the motor 118 to start said motor. This will throw the impact transmission mechanism 89 into operation and cause a hammering action on the forward end of the scoop 31 which will force said scoop into the material being loaded and break up said material so it may easily be picked up. When this material has been broken up the load against which the scoop 31 is working will be reduced. This will reduce pressure in the pressure line 410 and the spring 413 will return the piston 411 to its initial position in the cylinder 409. This will allow the circuit from the motor 118 to be opened and stop operation of the impact transmission mechanism 89. It may be seen that the pressure at which the impact transmission mechanism 89 is thrown into operation is determined by the spring 413 and that said impact transmission mechanism may be thrown in at any desired pressure by changing the strength of the spring 413.

While I have herein shown and described one form of my invention, I do not wish to be limited to the precise details of construction or arrangement of parts herein shown and described except as specifically limited in the appended claims.

I claim as my invention:

1. In a power shovel, the combination with a scoop, means for imparting thrusting movement to said scoop including a thrusting beam, and other means responsive to a predetermined pressure on said scoop acting on said thrusting beam for imparting an intermittent thrusting action to said scoop.

2. In a power shovel, the combination with a thrusting beam having a scoop on the forward end thereof, means for imparting thrusting movement to said thrusting beam, and means responsive to a predetermined pressure on said means for imparting thrusting movement to said thrusting beam and acting on said thrusting beam for imparting an intermittent thrusting action to said scoop.

3. In a power shovel, the combination with a thrusting beam having a scoop on the forward end thereof, fluid pressure means for imparting thrusting movement to said thrusting beam and scoop, and means responsive to a predetermined pressure in said fluid pressure means for imparting thrusting movement to said scoop for imparting an intermittent thrusting action to said scoop.

4. In a power shovel, the combination with a thrusting beam having a scoop on the forward end thereof, fluid pressure means for imparting thrusting movement to said thrusting beam and scoop comprising a fluid pressure cylinder and means responsive to a predetermined pressure in said fluid pressure cylinder for imparting an intermittent thrusting action to said scoop.

5. In a power shovel, the combination with a pair of thrusting beams having a scoop on the forward end thereof, hydraulic means for imparting thrusting movement to said thrusting beams and scoop comprising a pair of hydraulic cylinders, and means responsive to a predetermined pressure in said hydraulic cylinders for imparting an intermittent thrusting action to said scoop.

6. In a power shovel, the combination with a thrusting beam having a scoop on the forward end thereof, means for imparting thrusting movement to said thrusting beam, and means responsive to a predetermined pressure on said scoop for imparting an intermittent thrusting action to said scoop comprising a frame reciprocably movable longitudinally of said power shovel, a flywheel on said frame, and means for reciprocably moving said frame longitudinally with respect to said power shovel and imparting a hammering action to said scoop upon rotation of said flywheel comprising a cam driven by said flywheel and having operative connection with said thrusting beam.

7. In a power shovel, the combination with a pair of thrusting beams having a scoop on the forward end thereof, means for imparting thrusting movement to said thrusting beams, and means responsive to a predetermined pressure on said scoop for imparting an intermittent thrusting action to said scoop comprising a frame reciprocably movable longitudinally of said power shovel, a motor on said frame, a flywheel driven by said motor, a cam driven by said flywheel, and a connection between said cam and said thrusting beams for effecting reciprocable movement of said frame with respect to said power shovel upon rotation of said flywheel, said reciprocable movement of said frame effecting an intermittent thrusting action to said scoop.

8. In a power shovel, a base frame, a sliding frame, a forwardly extending beam having connection with said sliding frame for pivotal and limited sliding movement with respect thereto, a scoop on the forward end of said beam, means for elevating said scoop and beam, means for moving said sliding frame and effecting thrusting movement to said scoop, and means responsive to a predetermined pressure on said scoop for imparting an intermittent thrusting action to said scoop.

9. In a power shovel, a base frame, a sliding frame, a forwardly extending beam having connection with said sliding frame for pivotal and limited sliding movement with respect thereto, a scoop on the forward end of said beam, means for elevating said scoop and beam, means for moving said sliding frame and effecting thrusting movement to said scoop, and means responsive to a predetermined pressure on said scoop for imparting an intermittent thrusting action to said scoop comprising a weighted frame reciprocably movable longitudinally of said sliding frame and having operative connection with said scoop.

10. In a power shovel, a base frame, a sliding frame, a forwardly extending beam having connection with said sliding frame for pivotal and limited sliding movement with respect thereto, a scoop on the forward end of said beam, a closed fluid pressure system, means actuated by said fluid pressure system for elevating said scoop and beam, other means actuated by said fluid pressure system for moving said sliding frame with respect to said base frame for effecting thrusting movement of said scoop, and means responsive to a predetermined pressure on said scoop and in said means actuated by said fluid pressure system for moving said sliding frame with respect to said base frame for imparting an intermittent thrusting action to said scoop.

11. In a power shovel, a base frame, a sliding frame, a forwardly extending beam having connection with said sliding frame for pivotal and limited sliding movement with respect thereto, a scoop on the forward end of said beam, means for elevating said scoop and beam, means for moving said sliding frame and effecting thrusting movement to said scoop, and means responsive to a predetermined pressure on said scoop for imparting an intermittent thrusting action to said scoop comprising a weighted frame reciprocably movable longitudinally of said sliding frame and having operative connection with said scoop.

12. In a power shovel, a main frame, a conveyor, a scoop at the front end of said conveyor and communicating therewith, and means for effecting a relatively longitudinal thrusting action to said scoop and raising said scoop from the ground to a relatively horizontal position in a horizontal plane substantially parallel with the plane of said conveyor comprising a thrusting beam having connection with said scoop, said thrusting beam extending rearwardly of and upwardly from said scoop when said scoop is in a lowered position and being pivotally movable about a horizontal axis disposed rearwardly of said scoop, a pivotally movable frame having pivotal connection at one end with said thrusting beam rearwardly of said scoop and having pivotal connection with said main frame at its opposite end above said point of connection to said thrusting beam when said scoop is in a lowered position, and means for moving said pivotally movable frame about its axis of pivotal connection with said main frame and raising said scoop to a horizontal position.

13. In a power shovel, a main frame, a conveyor, a scoop at the front end of said conveyor and communicating therewith, and means for effecting a relatively longitudinal thrusting action to said scoop and raising said scoop from the ground to a relatively horizontal position in a horizontal plane substantially parallel with the plane of said conveyor comprising a thrusting beam having connection with said scoop, said thrusting beam extending rearwardly and upwardly from said scoop when said scoop is in a lowered position and being pivotally movable about a horizontal axis disposed rearwardly of said scoop, a frame having pivotal connection at one end with said thrusting beam rearwardly of said scoop and having pivotal connection with said main frame at its opposite end above said point of connection to said thrusting beam when said scoop is in a lowered position, and means for moving said pivotal frame about its axis of pivotal connection with said main frame comprising a fluid pressure cylinder operatively connectible with said pivotal frame.

14. In a power shovel, a main frame, a conveyor, a scoop at the front end of said conveyor and communicating therewith, and means for raising said scoop from the ground to a relatively horizontal position, said means also effecting a thrusting action to said scoop comprising a pair of thrusting beams having connection with said scoop, said thrusting beams having a slidable pivotal connection with said main frame, a pivotally movable frame having pivotal connection with said thrusting beams at one of its ends and having pivotal connection with said main frame at its opposite end above said thrusting beams, and means for moving said pivotally movable frame about said last mentioned pivotal axis and elevating said beams and scoop.

15. In a power shovel, a main frame, a conveyor, a scoop at the front end of said conveyor and communicating therewith, and means for raising said scoop from the ground to a relatively horizontal position, said means also effecting a thrusting action to said scoop comprising a pair of thrusting beams having connection with said scoop, said thrusting beams having a slidable pivotal connection with said main frame, a pivotally movable frame having pivotal connection with said thrusting beams at one of its ends and having pivotal connection with said main frame at its opposite end above said thrusting beams, and means for moving said pivotal frame about said last mentioned pivotal axis and elevating said beams and scoop comprising a fluid pressure actuated cylinder.

16. In a power shovel, a base frame, a turntable on said base frame, a sliding frame on said base frame, a pair of thrusting beams mounted on said sliding frame for pivotal and limited longitudinal movement with respect thereto, a scoop on the forward end of said thrusting beams, said sliding frame effecting a longitudinal thrusting movement of said scoop, means for elevating said scoop comprising a pivotally movable frame having pivotal connection with said thrusting beam at one of its ends intermediate the ends of said thrusting beams, and having pivotal connection with said sliding frame at its opposite end above said point of connection to said thrusting beam when said scoop is in a lowered position, and means for moving said pivotally movable frame about its axis of pivotal connection with said sliding frame for elevating said scoop.

17. In a power shovel, a base frame, a turntable on said base frame, a sliding frame on said base frame, a pair of thrusting beams mounted on said sliding frame for pivotal and limited longitudinal movement with respect thereto, a scoop on the forward end of said thrusting beams, said sliding frame effecting a longitudinal thrusting movement of said scoop, and means for elevating said scoop comprising a fluid pressure cylinder on said sliding frame, an elevating frame having pivotal connection with said fluid pressure cylinder forwardly of said fluid pressure cylinder for movement therewith, a support frame having pivotal connection with the forward end of said elevating frame above said fluid pressure cylinder and having pivotal connection with said sliding frame adjacent the rearward end of said fluid pressure cylinder, and a pivotally movable frame having pivotal connection at one end with said elevating and support frames and having pivotal connection at its opposite end with said thrusting beams, said elevating frame having bearing engagement with said pivotally movable frame beneath its point of pivotal connection with said elevating and support frames for moving said pivotally movable frame about its axis of pivotal connection with said elevating frame upon actuation of said fluid pressure cylinders.

18. In a power shovel, a base frame, a turntable on said base frame, a sliding frame on said base frame, a pair of thrusting beams mounted on said sliding frame for pivotal and limited longitudinal movement with respect thereto, a scoop on the forward end of said thrusting beams, said sliding frame effecting a longitudinal thrusting movement of said scoop, and means for elevating said scoop comprising a pair of fluid pressure cylinders on said sliding frame, an elevating frame having pivotal connection with said fluid pressure cylinders for movement therewith, a support frame having pivotal connection with said elevating frame above said fluid pressure cylinders and having pivotal connection with said sliding frame adjacent the rearward end of said fluid pressure cylinders, and a pivotally movable frame having pivotal connection at one end with said elevating and support frames and having pivotal connection at its opposite end with said thrusting beams, said elevating frame having bearing engagement with said pivotally movable frame beneath its point of pivotal connection with said elevating and support frames for moving said pivotally movable frame about its axis of pivotal connection with said elevating frame upon actuation of said fluid pressure cylinders.

19. In a power shovel, a base frame, a scoop, and means for effecting a relatively longitudinal thrusting movement to said scoop and raising said scoop from the ground comprising a thrusting beam having connection with said scoop, said thrusting beam extending rearwardly and upwardly from said scoop when said scoop is in a lowered position and being supported on said base frame for pivotal movement with respect thereto, a pivotally movable frame having pivotal connection with said thrusting beam at one of its ends and having pivotal connection with said base frame at its opposite end above said point of pivotal connection to said thrusting beam when said scoop is in a lowered position and means bearing against said pivotally movable frame for moving said pivotally movable frame about its axis of pivotal connection with said base frame and raising said scoop to a horizontal position.

20. In a power shovel, a base frame, a thrusting beam mounted on said base frame for pivotal movement with respect thereto, a scoop on the forward end of said thrusting beam, and means for elevating said scoop comprising a fluid pressure cylinder on said base frame, an elevating frame having pivotal connection with said fluid pressure cylinder forwardly of said fluid pressure cylinder for movement therewith, a support frame having pivotal connection with said base frame adjacent the rearward end of said fluid pressure cylinder, and a pivotally movable frame having pivotal connection at one end with said elevating and support frame and having pivotal connection at its opposite end with said thrusting beam, said elevating frame having bearing engagement with said pivotally movable frame beneath its point of pivotal connection with said elevating frame for moving said pivotally movable frame about its axis of pivotal connection with said elevating frame upon actuation of said fluid pressure cylinders.

WILLIAM W. SLOANE.

CERTIFICATE OF CORRECTION.

Patent No. 2,006,607.

July 2, 1935.

WILLIAM W. SLOANE.

It is hereby certified that error appears in the printed specification of the above numbered patent requiring correction as follows: Page 1, first column, line 17, for "herein" read wherein; page 2, first column, line 65, for "inerconnecting" read interconnecting; and page 10, first column, lines 53, 55 and 57, claim 5, for "hydraulic" read fluid pressure; and that the said Letters Patent should be read with these corrections therein that the same may conform to the record of the case in the Patent Office.

Signed and sealed this 20th day of August, A. D. 1935.

Leslie Frazer

Acting Commissioner of Patents.

(Seal)